United States Patent
Keicho et al.

(10) Patent No.: US 12,313,949 B2
(45) Date of Patent: May 27, 2025

(54) POLARIZATION MODULATION ELEMENT AND THREE-DIMENSIONAL-IMAGE DISPLAY DEVICE

(71) Applicant: Shanghai Tianma Micro-Electronics Co., Ltd., Shanghai (CN)

(72) Inventors: Yukie Keicho, Kanagawa (JP); Tetsushi Sato, Kanagawa (JP); Ken Sumiyoshi, Kanagawa (JP)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/526,630

(22) Filed: Dec. 1, 2023

(65) Prior Publication Data

US 2024/0210778 A1 Jun. 27, 2024

(30) Foreign Application Priority Data

Dec. 26, 2022 (JP) ................................. 2022-208149

(51) Int. Cl.
| | |
|---|---|
| *G02F 1/139* | (2006.01) |
| *G02B 30/25* | (2020.01) |
| *G02B 30/27* | (2020.01) |
| *G02F 1/13363* | (2006.01) |
| *G02F 1/1347* | (2006.01) |

(52) U.S. Cl.
CPC ........... *G02F 1/1396* (2013.01); *G02B 30/25* (2020.01); *G02B 30/27* (2020.01); *G02F 1/133636* (2013.01); *G02F 1/13471* (2013.01)

(58) Field of Classification Search
CPC ........ G02B 30/00; G02B 30/20; G02B 30/22; G02B 30/25; G02F 1/1347; G02F 1/13471; G02F 1/1396
See application file for complete search history.

(56) References Cited

U.S. PATENT DOCUMENTS

2024/0004239 A1* 1/2024 Ikeda ................ G02F 1/133753

FOREIGN PATENT DOCUMENTS

| JP | 2000-356763 A | | 12/2000 |
|---|---|---|---|
| JP | 2002156603 A | * | 5/2002 |
| JP | 2003-75800 A | | 3/2003 |
| JP | 2003-233054 A | | 8/2003 |
| JP | 2003-270610 A | | 9/2003 |
| JP | 2005-129983 A | | 5/2005 |

* cited by examiner

*Primary Examiner* — Jessica M Merlin
(74) *Attorney, Agent, or Firm* — Sughrue Mion, PLLC

(57) ABSTRACT

A polarization modulation element includes N twisted nematic liquid crystal cells (where N is an integer of 3 or greater) for which a twist direction is identical. A sum of a twist angle of each of the twisted nematic liquid crystal cells is 90°. In at least one of the twisted nematic liquid crystal cells that are adjacent, the alignment axis direction of the light emitting-side substrate and the alignment axis direction of the light incident-side substrate are orthogonal to each other. In the other twisted nematic liquid crystal cells that are adjacent, the alignment axis direction of the light emitting-side substrate and the alignment axis direction of the light incident-side substrate match.

8 Claims, 25 Drawing Sheets

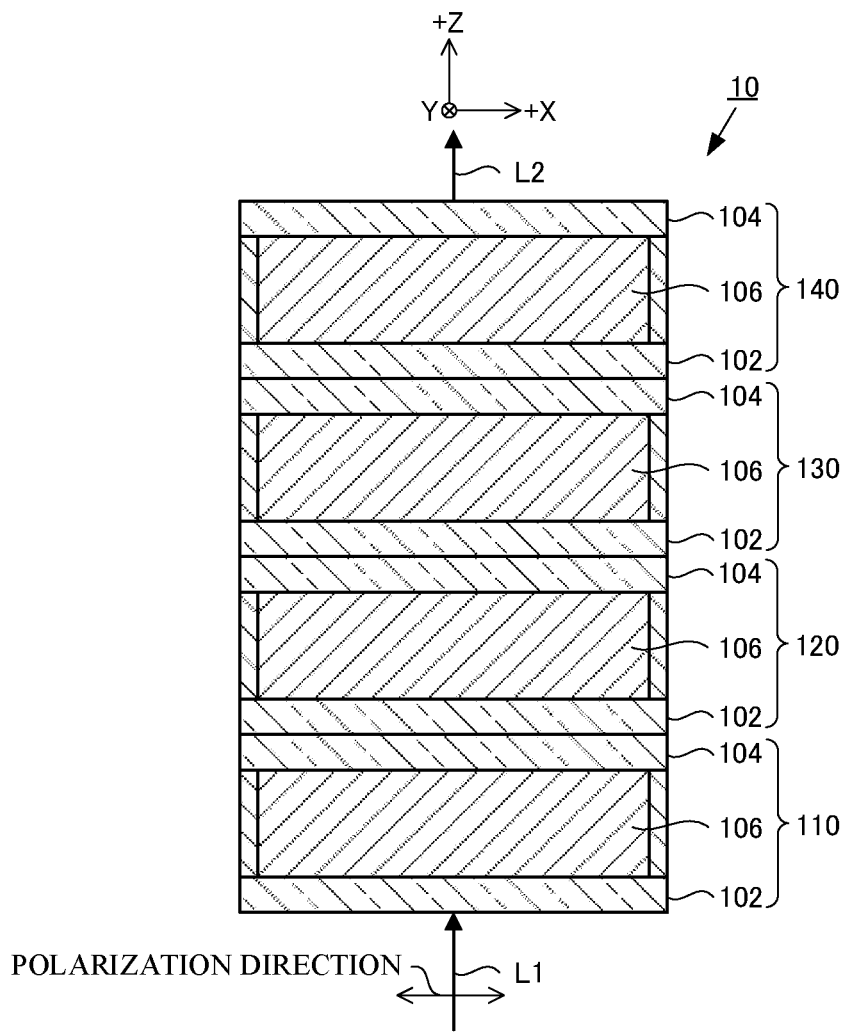
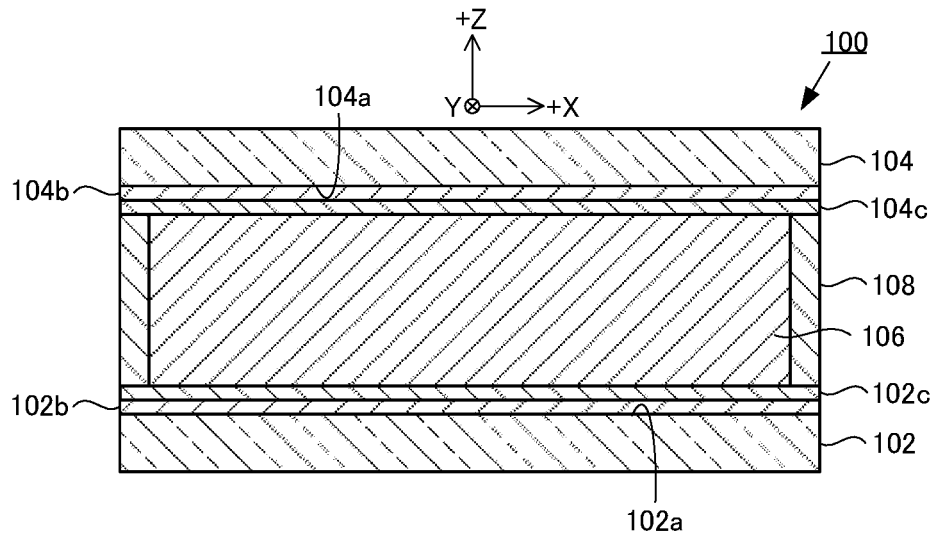

POLARIZATION CONTRAST AND OPTIMAL VOLTAGE

| pCR | 10 | 20 | 30 | 50 | 100 |
|---|---|---|---|---|---|
| VOLTAGE TO BE APPLIED TO THIRD TN CELL | 12.1V | 14.4V | 16.0V | 18.4V | 21.9V |
| VOLTAGE TO BE APPLIED TO SECOND TN CELL | 12.1V | 14.4V | 16.0V | 18.4V | 21.9V |
| VOLTAGE TO BE APPLIED TO FIRST TN CELL | 5.2V | 6.1V | 6.6V | 7.2V | 9.8V |

FIG.31

POLARIZATION CONTRAST AND OPTIMAL VOLTAGE

| pCR | 10 | 20 | 30 | 50 | 100 |
|---|---|---|---|---|---|
| VOLTAGE TO BE APPLIED TO FOURTH TN CELL | 4.8V | 5.9V | 6.1V | 6.8V | 7.7V |
| VOLTAGE TO BE APPLIED TO THIRD TN CELL | 9.8V | 11.8V | 12.8V | 14.6V | 17.4V |
| VOLTAGE TO BE APPLIED TO SECOND TN CELL | 9.8V | 11.8V | 12.8V | 14.6V | 17.4V |
| VOLTAGE TO BE APPLIED TO FIRST TN CELL | 5.2V | 5.4V | 6.2V | 6.8V | 8.3V |

FIG.32

ALIGNMENT AXIS DIRECTION

| | ANGLE (CLOCKWISE) OF ALIGNMENT AXIS DIRECTION OF LIGHT INCIDENT-SIDE SUBSTRATE RELATIVE TO +X DIRECTION | ANGLE (CLOCKWISE) OF ALIGNMENT AXIS DIRECTION OF LIGHT EMITTING-SIDE SUBSTRATE RELATIVE TO +X DIRECTION |
|---|---|---|
| SIXTH TN CELL | 165° | 180° |
| FIFTH TN CELL | 150° | 165° |
| FOURTH TN CELL | 135° | 150° |
| THIRD TN CELL | 30° | 45° |
| SECOND TN CELL | 15° | 30° |
| FIRST TN CELL | 0° | 15° |

ALIGNMENT AXIS DIRECTION

|  | ANGLE (CLOCKWISE) OF ALIGNMENT AXIS DIRECTION OF LIGHT INCIDENT-SIDE SUBSTRATE RELATIVE TO +X DIRECTION | ANGLE (CLOCKWISE) OF ALIGNMENT AXIS DIRECTION OF LIGHT EMITTING-SIDE SUBSTRATE RELATIVE TO +X DIRECTION |
|---|---|---|
| SIXTH TN CELL | 255° | 270° |
| FIFTH TN CELL | 240° | 255° |
| FOURTH TN CELL | 135° | 150° |
| THIRD TN CELL | 120° | 135° |
| SECOND TN CELL | 105° | 120° |
| FIRST TN CELL | 0° | 15° |

POLARIZATION CONTRAST AND OPTIMAL VOLTAGE

| pCR | 10 | 20 | 30 | 100 |
|---|---|---|---|---|
| VOLTAGE TO BE APPLIED TO SIXTH TN CELL | 9.8V | 11.3V | 13.1V | 16.3V |
| VOLTAGE TO BE APPLIED TO FIFTH TN CELL | 9.8V | 11.3V | 13.1V | 16.3V |
| VOLTAGE TO BE APPLIED TO FOURTH TN CELL | 14.4V | 17.3V | 18.9V | 26.0V |
| VOLTAGE TO BE APPLIED TO THIRD TN CELL | 14.4V | 17.3V | 18.9V | 26.0V |
| VOLTAGE TO BE APPLIED TO SECOND TN CELL | 14.4V | 17.3V | 18.9V | 26.0V |
| VOLTAGE TO BE APPLIED TO FIRST TN CELL | 4.7V | 5.4V | 5.3V | 7.5V |

FIG.41

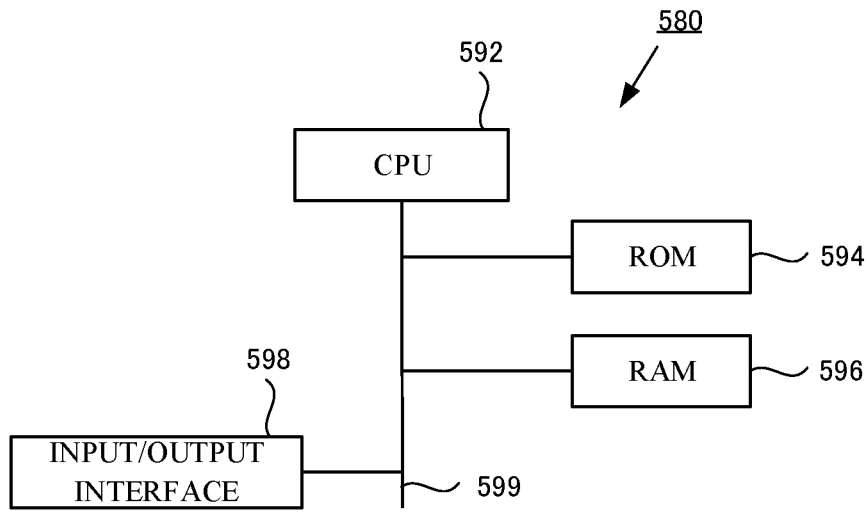

FIG.42

ALIGNMENT AXIS DIRECTION

|  | ANGLE (CLOCKWISE) OF ALIGNMENT AXIS DIRECTION OF LIGHT INCIDENT-SIDE SUBSTRATE RELATIVE TO +X DIRECTION | ANGLE (CLOCKWISE) OF ALIGNMENT AXIS DIRECTION OF LIGHT EMITTING-SIDE SUBSTRATE RELATIVE TO +X DIRECTION |
|---|---|---|
| EIGHTH TN CELL | 168.75° | 180° |
| SEVENTH TN CELL | 157.5° | 168.75° |
| SIXTH TN CELL | 146.25° | 157.5° |
| FIFTH TN CELL | 135° | 146.25° |
| FOURTH TN CELL | 33.75° | 45° |
| THIRD TN CELL | 22.5° | 33.75° |
| SECOND TN CELL | 11.25° | 22.5° |
| FIRST TN CELL | 0° | 11.25° |

FIG.43

ALIGNMENT AXIS DIRECTION

|  | ANGLE (CLOCKWISE) OF ALIGNMENT AXIS DIRECTION OF LIGHT INCIDENT-SIDE SUBSTRATE RELATIVE TO +X DIRECTION | ANGLE (CLOCKWISE) OF ALIGNMENT AXIS DIRECTION OF LIGHT EMITTING-SIDE SUBSTRATE RELATIVE TO +X DIRECTION |
|---|---|---|
| EIGHTH TN CELL | 258.75° | 270° |
| SEVENTH TN CELL | 247.5° | 258.75° |
| SIXTH TN CELL | 146.25° | 157.5° |
| FIFTH TN CELL | 135° | 146.25° |
| FOURTH TN CELL | 123.75° | 135° |
| THIRD TN CELL | 112.5° | 123.75° |
| SECOND TN CELL | 11.25° | 22.5° |
| FIRST TN CELL | 0° | 11.25° |

FIG.44

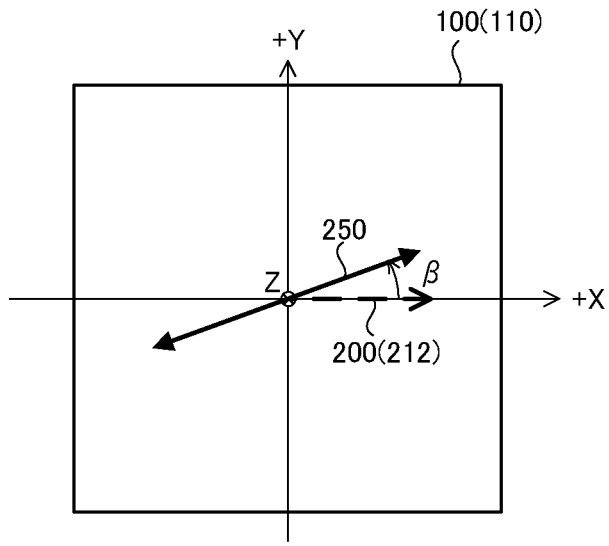

POLARIZATION MODULATION ELEMENT AND THREE-DIMENSIONAL-IMAGE DISPLAY DEVICE

CROSS-REFERENCE TO RELATED APPLICATIONS

This application claims the benefit of Japanese Patent Application No. 2022-208149, filed on Dec. 26, 2022, the entire disclosure of which is incorporated by reference herein.

FIELD OF THE INVENTION

The present disclosure relates generally to a polarization modulation element and a three-dimensional-image display device.

BACKGROUND OF THE INVENTION

Display devices, optical switches, and the like that include a polarization modulation element that uses a twisted nematic liquid crystal are known in the related art. For example, Unexamined Japanese Patent Application Publication No. 2005-129983 describes a three-dimensional display device including a display device that alternately displays two two-dimensional images, a polarizing plate that emits emission light from the display device as polarized light, a polarization switching device (polarization modulation element) that switches the polarization direction of the emission light emitted from the polarizing plate, and a polarized bifocal lens. Additionally, Unexamined Japanese Patent Application Publication No. 2003-75800 describes a liquid crystal optical switch including a liquid crystal polarization rotator (polarization modulation element) formed from a plurality of liquid crystal cells.

In the plurality of liquid crystal cells forming the liquid crystal polarization rotator of Unexamined Japanese Patent Application Publication No. 2003-75800, the ratio of the cell thickness to the twist angle is substantially equal, and the twist directions are equal. Furthermore, in adjacent liquid crystal cells, the liquid crystal director azimuth angle of the liquid crystal layer in contact with the light emitting-side substrate and the liquid crystal director azimuth angle of the liquid crystal layer in contact with the light incident-side substrate are substantially equal. Due to these configurations, the cell thickness of each of the liquid crystal cells is thinned, and shortening of the response time of the liquid crystal cells (that is, the liquid crystal optical switch) is realized.

In twisted nematic (TN) cells, the liquid crystal molecules near the interface between the liquid crystal layer and the substrate (alignment film) are less likely to respond to applied voltage and, consequently, birefringence due to the liquid crystal molecules remains near the interface. In 90° TN cells in which the liquid crystal director azimuth angle of the liquid crystal layer in contact with the light incident-side substrate and the liquid crystal director azimuth angle of the liquid crystal layer in contact with the light emitting-side substrate are orthogonal to each other, the liquid crystal director azimuth angle near the interface can be set to 0° and 90° with respect to the polarization direction of the incident linearly polarized light. In this case, the polarization state of the linearly polarized light that enters the 90° TN cells is maintained without being affected by the residual birefringence near the interface between the light incident-side substrate and the light emitting-side substrate, and is emitted as linearly polarized light.

In Unexamined Japanese Patent Application Publication No. 2003-75800, shortening of the response time is realized by dividing a 90° TN cell into a plurality of TN liquid crystal cells. When the 90° TN cell is divided into a plurality of TN cells, substrates (the light incident-side substrate and the light emitting-side substrate) exist in which the liquid crystal director azimuth angle near the interface is not 0° or 90° with respect to the polarization direction of the linearly polarized light. Accordingly, when the linearly polarized light enters while voltage is applied, the emission light of the liquid crystal optical switch of Unexamined Japanese Patent Application Publication No. 2003-75800 becomes elliptically polarized light due to the residual birefringence. As such, with the liquid crystal optical switch of Unexamined Japanese Patent Application Publication No. 2003-75800, the intensity of the polarized component having the desired polarization direction decreases. Moreover, when high voltage is applied to the TN cell to cause the liquid crystal molecules near the interface to respond, power consumption increases. Furthermore, the TN cells may short.

SUMMARY OF THE INVENTION

A polarization modulation element according to a first aspect includes:
  N twisted nematic liquid crystal cells for which a twist direction is identical, N being an integer of 3 or greater, wherein
  each of the twisted nematic liquid crystal cells includes a light incident-side substrate and a light emitting-side substrate that sandwich a liquid crystal,
  a sum of a twist angle of each of the twisted nematic liquid crystal cells is 90°,
  the twisted nematic liquid crystal cells are sequentially stacked with the light incident-side substrate of one of the twisted nematic liquid crystal cells opposing the light emitting-side substrate of another of the twisted nematic liquid crystal cells,
  in at least one group of the twisted nematic liquid crystal cells that are adjacent, an alignment axis direction of the light emitting-side substrate of one of the twisted nematic liquid crystal cells and an alignment axis direction of the light incident-side substrate of another of the twisted nematic liquid crystal cells are orthogonal to each other, and
  in the twisted nematic liquid crystal cells that are adjacent, except for the at least one group of the twisted nematic liquid crystal cells that are adjacent, the alignment axis direction of the light emitting-side substrate of one of the twisted nematic liquid crystal cells and the alignment axis direction of the light incident-side substrate of another of the twisted nematic liquid crystal cells match.

A three-dimensional-image display device according to a second aspect includes:
  the polarization modulation element;
  a display unit that sequentially displays a first image and a second image, and emits display light of the first image and display light of the second image as polarized light, that enters the polarization modulation element, for which a polarization direction is a predetermined first direction; and
  a polarized bifocal lens into which emission light emitted from the polarization modulation element enters, and in which a focal distance for the emission light emitted from the polarization modulation element differs based on the polarization direction of the emission light, wherein the first image and the second image are two-dimensional images obtained by projecting, from a side of an observer, a display subject on each of a first display surface and a second display surface positioned at different positions in a depth direction from a perspective of the observer, the polarization modulation element maintains the polarization direction of the polarized light in the predetermined first direction and emits when the polarized light is the display light of the first image, and changes the polarization direction of the polarized light to a second direction orthogonal to the predetermined first direction and emits when the polarized light is the display light of the second image, thereby switching the polarization direction of the emission light between the predetermined first direction and the second direction and emitting, and the polarized bifocal lens forms each of the first image and the second image as a virtual image on each of the first display surface and the second display surface.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which:

FIG. 1 is a schematic view illustrating a cross-section of a polarization modulation element according to Embodiment 1;

FIG. 2 is a schematic drawing illustrating a cross-section of a TN cell according to Embodiment 1;

FIG. 31 is a drawing illustrating the polarization contrast and an optimal voltage according to Embodiment 3;

FIG. 32 is a drawing illustrating an alignment axis direction of TN cells according to Embodiment 4;

FIG. 41 is a drawing illustrating the hardware configuration of the controller according to Embodiment 6;

FIG. 42 is a drawing illustrating an alignment axis direction of TN cells according to Modified Example 1;

FIG. 43 is a drawing illustrating an alignment axis direction of TN cells according to Modified Example 2;

FIG. 44 is a drawing illustrating a polarization direction of incident light and an alignment axis direction of a first TN cell according to a modified example;

DETAILED DESCRIPTION OF THE INVENTION

Figure 3:
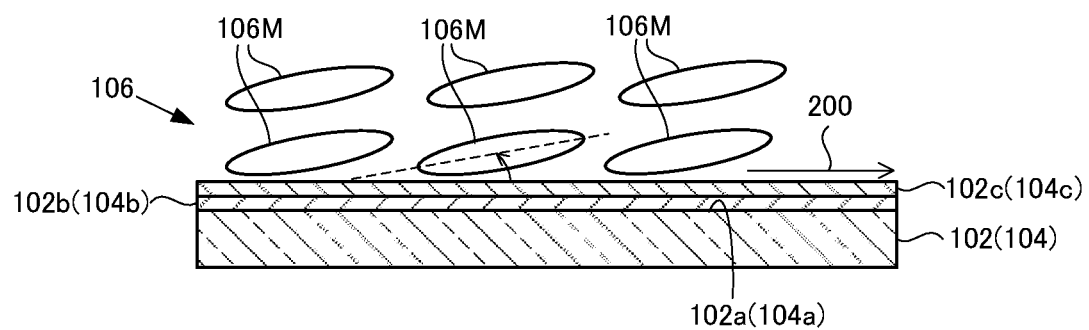
FIG. 3 is a schematic drawing illustrating an alignment axis direction according to Embodiment 1.

Hereinafter, a polarization modulation element and a three-dimensional-image display device according to embodiments are described while referencing the drawings.

Embodiment 1

A polarization modulation element 10 according to the present embodiment is described while referencing FIGS. 1 to 15. As illustrated in FIG. 1, the polarization modulation element 10 includes four (N=4) twisted nematic liquid crystal cells 110 to 140 for which a twist direction is identical. The polarization modulation element 10 is formed by sequentially stacking the twisted nematic liquid crystal cells 110 to 140 with non-illustrated adhesive layers provided therebetween. In a state in which voltage is not applied (initial alignment state), the polarization modulation element 10 rotates a polarization direction of linearly polarized light (incident light) L1 incident on the twisted nematic liquid crystal cell 110 90°, and emits this light as emission light L2. Additionally, in a state in which voltage is applied (ON state), the polarization modulation element 10 maintains the polarization direction of the linearly polarized light L1 and attempts to emit this light as the emission light L2.

In the present specification, to facilitate comprehension, a description is given in which, in FIG. 1, the right direction (the right direction on paper) of the polarization modulation element 10 is referred to as the "+X direction", the up direction (the up direction on paper) is referred to as the "+Z direction", and the direction perpendicular to the +X direction and the +Z direction (the depth direction on paper) is referred to as the "+Y direction." The polarization direction of the linearly polarized light L1 incident on the polarization modulation element 10 is set as the "X direction." The twisted nematic liquid crystal cells may be referred to as twisted nematic (TN) cells, and may be referred to as an $m^{th}$ (where m is an integer of 1 or greater) TN cell from the side on which the linearly polarized light L1 is incident. Furthermore, the twisted nematic liquid crystal cells (TN cells) may be referred to collectively as "twisted nematic liquid crystal cells 100" or "TN cells 100."

Firstly, the TN cells 100 are described. As illustrated in FIG. 2, each of the TN cells 100 includes a light incident-side substrate 102, a light emitting-side substrate 104, and a nematic liquid crystal 106. As illustrated in FIG. 1, the TN cells 100 are sequentially stacked with the light incident-side substrate 102 of one of the TN cells 100 and the light emitting-side substrate 104 of another of the TN cells 100 opposing each other.

As illustrated in FIG. 1, the light incident-side substrate 102 is a substrate that is positioned on the side on which the linearly polarized light L1 is incident. As illustrated in FIG. 2, the light incident-side substrate 102 opposes the light emitting-side substrate 104. The light incident-side substrate 102 and the light emitting-side substrate 104 sandwich the nematic liquid crystal 106. In one example, the light incident-side substrate 102 is implemented as a glass substrate. The light incident-side substrate 102 includes a light-transmitting electrode 102b and an alignment film 102c on a main surface 102a that opposes the light emitting-side substrate 104.

The light-transmitting electrode 102b of the light incident-side substrate 102 is formed on the entire surface of the main surface 102a. The light-transmitting electrode 102b is formed from indium tin oxide (ITO). The alignment film 102c of the light incident-side substrate 102 aligns the nematic liquid crystal 106 in a predetermined direction. In one example, the alignment film 102c of the light incident-side substrate 102 is implemented as a polyimide alignment film. The alignment of the nematic liquid crystal 106 is described later.

As illustrated in FIG. 1, the light emitting-side substrate 104 is a substrate that is positioned on the side from which the emission light L2 is emitted. As illustrated in FIG. 2, the light incident-side substrate 102 and the light emitting-side substrate 104 are affixed to each other by a seal material 108. In one example, the light emitting-side substrate 104 is implemented as a glass substrate. The light emitting-side substrate 104 includes a light-transmitting electrode 104b and an alignment film 104c on a main surface 104a that opposes the light incident-side substrate 102.

The light-transmitting electrode 104b of the light emitting-side substrate 104 is formed on the entire surface of the main surface 104a. The light-transmitting electrode 104b is formed from indium tin oxide (ITO). The alignment film 104c of the light emitting-side substrate 104 aligns the nematic liquid crystal 106 in a predetermined direction. In one example, the alignment film 104c of the light emitting-side substrate 104 is implemented as a polyimide alignment film.

The nematic liquid crystal 106 is sandwiched by the light incident-side substrate 102 and the light emitting-side substrate 104. In the present embodiment, a refractive index anisotropy $\Delta n$ of the nematic liquid crystal 106 is 0.1948 at a wavelength of 380 nm, and is 0.1403 at a wavelength of 535 nm. Additionally, a dielectric anisotropy $\Delta \varepsilon$ of the nematic liquid crystal 106 is 4.8 at 20° C. Note that a cell thickness (thickness of the nematic liquid crystal 106) of the TN cells 100 of the present embodiment is 5.47 μm. The refractive index anisotropy Δn and the cell thickness of the nematic liquid crystal 106 are set to values whereby, in the initial alignment state, the polarization direction of the linearly polarized light L1 having a predetermined wavelength is rotated 90°, and is emitted from the polarization modulation element 10 as the emission light L2.

Next, the alignment of the nematic liquid crystal 106 (that is, liquid crystal molecules 106M) is described. As with the nematic liquid crystal of typical TN cells, in the state (the initial alignment state) in which voltage is not applied, the nematic liquid crystal 106 is twist aligned by the alignment film 102c of the light incident-side substrate 102 and the alignment film 104c of the light emitting-side substrate 104. In the present specification, as illustrated in FIG. 3, the initial alignment direction of the liquid crystal molecules 106M at the interface between the nematic liquid crystal 106 and the alignment film 102c or the alignment film 104c is defined as an alignment axis direction 200 of the light incident-side substrate 102 or the light emitting-side substrate 104. Note that the alignment axis directions of the TN cells 110 to 140 are also referred to collectively as the "alignment axis direction 200".

As illustrated in FIGS. 4 to 7, in the initial alignment state of the TN cells 110 to 140, the nematic liquid crystal 106 is aligned twisted clockwise when viewed from above from the +Z side. A twist angle α of the TN cells 110 to 140 (that is, a twist angle of the nematic liquid crystal 106) is 22.5°, and a sum of the twist angles α of each of the TN cells 110 to 140 is 90°. Note that the alignment axis directions 200 of the TN cells 110 to 140 differ.

Figure 4:
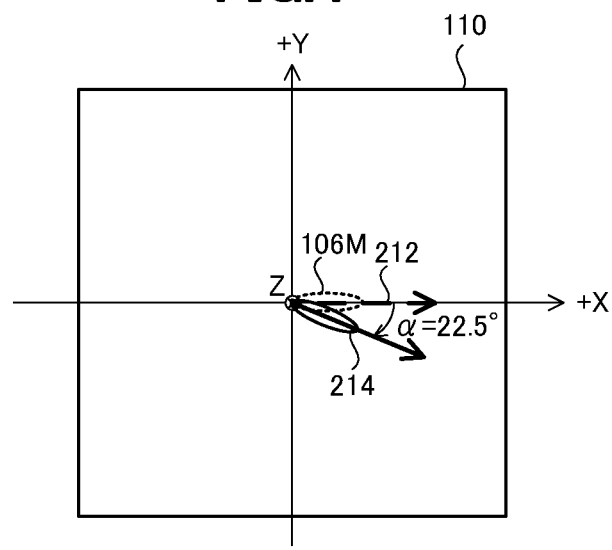
FIG. 4 is a drawing illustrating the alignment axis direction and an alignment of a nematic liquid crystal of a first TN cell according to Embodiment 1.

Specifically, as illustrated in FIG. 4, in the first TN cell 110 on which the linearly polarized light L1 is incident, an alignment axis direction 212 of the light incident-side substrate 102 is the +X direction. An alignment axis direction 214 of the light emitting-side substrate 104 of the TN cell 110 is inclined 22.5° clockwise with respect to the +X direction.

Figure 5:
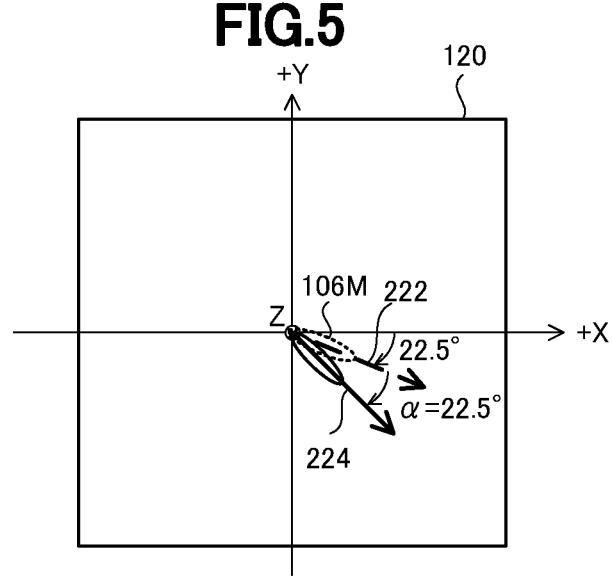
FIG. 5 is a drawing illustrating the alignment axis direction and the alignment of the nematic liquid crystal of a second TN cell according to Embodiment 1.

As illustrated in FIG. 5, in the second TN cell 120, an alignment axis direction 222 of the light incident-side substrate 102 is inclined 22.5° clockwise with respect to the +X direction, and matches the alignment axis direction 214 of the light emitting-side substrate 104 of the TN cell 110. An alignment axis direction 224 of the light emitting-side substrate 104 of the TN cell 120 is inclined 45° clockwise with respect to the +X direction.

Figure 6:
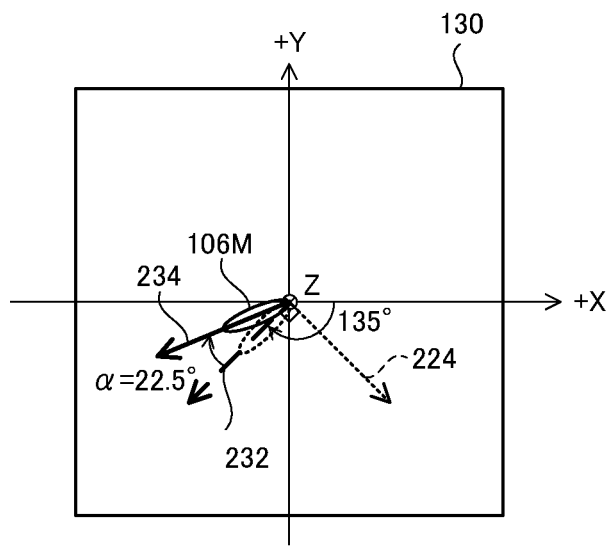
FIG. 6 is a drawing illustrating the alignment axis direction and the alignment of the nematic liquid crystal of a third TN cell according to Embodiment 1.

As illustrated in FIG. 6, in the third TN cell 130, an alignment axis direction 232 of the light incident-side substrate 102 is inclined 135° clockwise with respect to the +X direction, and is orthogonal to the alignment axis direction 224 of the light emitting-side substrate 104 of the TN cell 120. An alignment axis direction 234 of the light emitting-side substrate 104 of the TN cell 130 is inclined 157.5° clockwise with respect to the +X direction.

Figure 7:
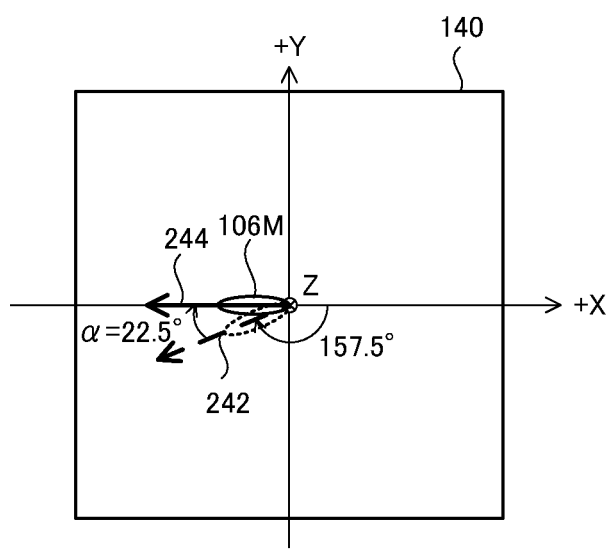
FIG. 7 is a drawing illustrating the alignment axis direction and the alignment of the nematic liquid crystal of a fourth TN cell according to Embodiment 1.

As illustrated in FIG. 7, in the fourth TN cell 140, an alignment axis direction 242 of the light incident-side substrate 102 is inclined 157.5° clockwise with respect to the +X direction, and matches the alignment axis direction 234 of the light emitting-side substrate 104 of the TN cell 130. An alignment axis direction 224 of the light emitting-side substrate 104 of the TN cell 140 is rotated 180° clockwise with respect to the +X direction.

In the present embodiment, as described later, in the second $(N/2^{th})$ TN cell 120 and the third $((N/2)+1^{th})$ TN cell 130 that are adjacent, the alignment axis direction 224 of the light emitting-side substrate 104 of the TN cell 120 and the alignment axis direction 232 of the light incident-side substrate 102 of the TN cell 130 are orthogonal to each other and, as such, in the ON state, residual birefringence of the nematic liquid crystal 106 near the interface is canceled out. Due to this, in the ON state, the polarization modulation element 10 can emit, at high intensity, a polarized component having a desired polarization direction.

Figure 8:
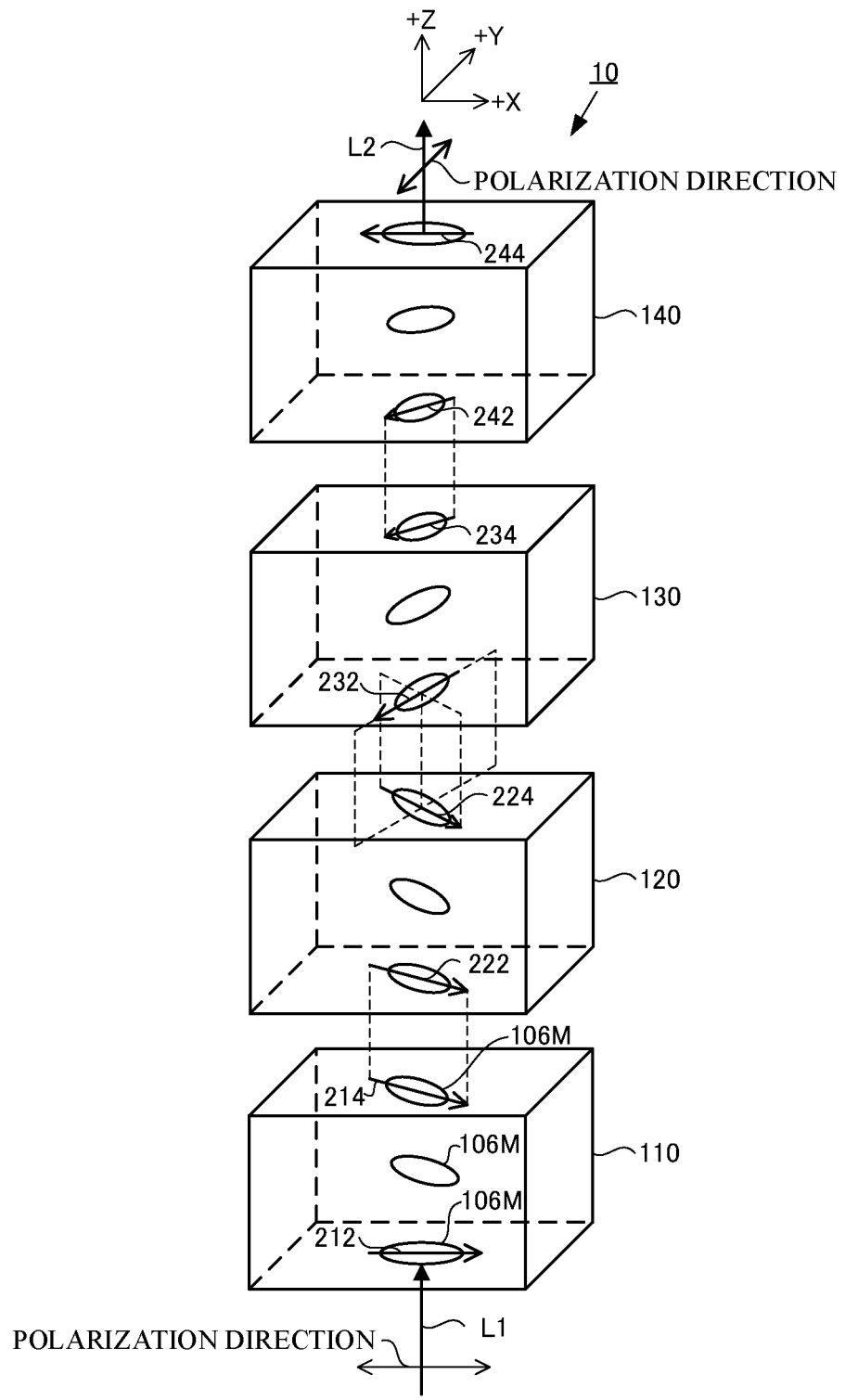
FIG. 8 is a schematic drawing illustrating an alignment state of the nematic liquid crystal of the polarization modulation element according to Embodiment 1, in an initial state.
Figure 9:
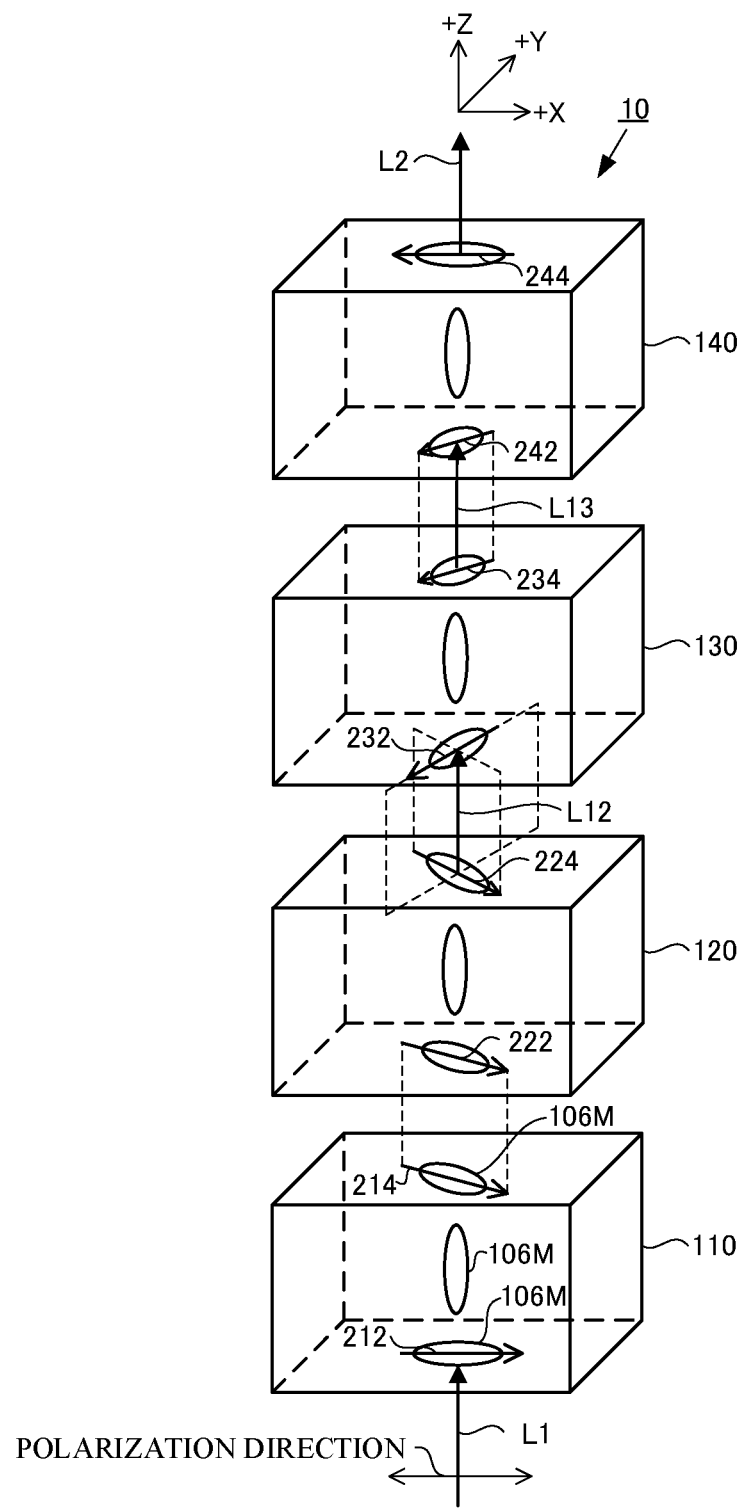
FIG. 9 is a schematic drawing illustrating the alignment state of the nematic liquid crystal of the polarization modulation element according to Embodiment 1, in an ON state.
Figure 10:
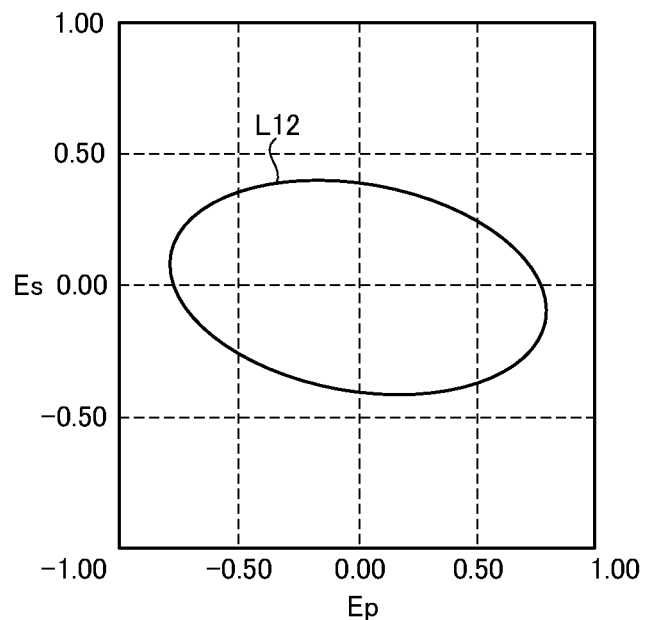
FIG. 10 is a drawing illustrating a polarization state of emission light emitted from the second TN cell in the ON state, according to Embodiment 1.
Figure 11:
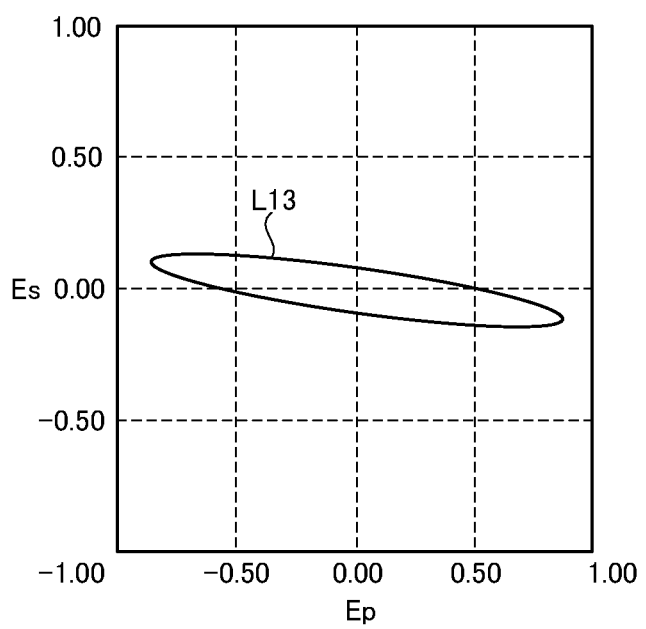
FIG. 11 is a drawing illustrating the polarization state of the emission light emitted from the third TN cell in the ON state, according to Embodiment 1.
Figure 12:
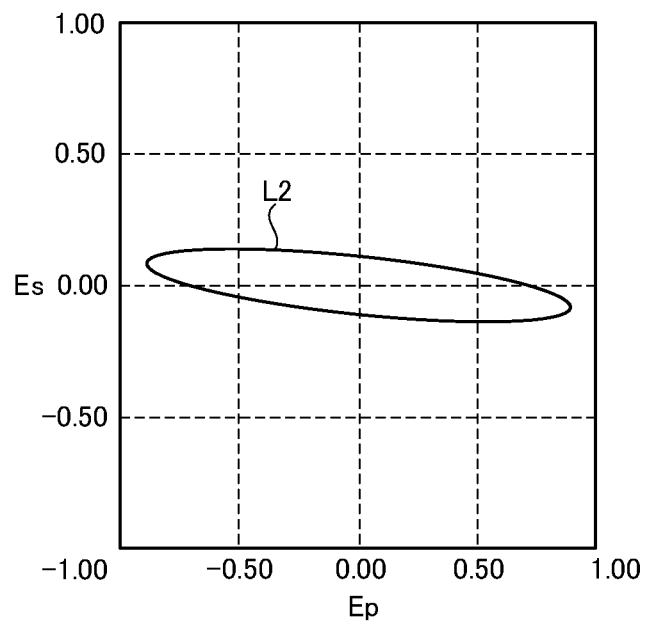
FIG. 12 is a drawing illustrating the polarization state of the emission light emitted in the ON state, according to Embodiment 1.

Next, the operations of the polarization modulation element 10 are described. FIG. 8 is a schematic drawing illustrating an alignment state of the nematic liquid crystal 106, in the state (the initial alignment state) in which voltage is not applied. FIG. 9 is a schematic drawing illustrating the alignment state of the nematic liquid crystal 106, in the state (the ON state) in which predetermined voltage (for example, 20V) is applied to each of the TN cells 110 to 140. FIG. 10 is a drawing illustrating a polarization state of emission light L12 emitted from the second TN cell 120 in the ON state, and FIG. 11 is a drawing illustrating a polarization state of emission light L13 emitted from the third TN cell 130 in the ON state. Furthermore, FIG. 12 is a drawing illustrating the polarization state of the emission light L2 emitted from the polarization modulation element 10, in the ON state. Note that the light incident-side substrate 102, the light emitting-side substrate 104, and the like are omitted from FIGS. 8 and 9. Additionally, in FIGS. 10 to 12, the trajectory of the leading edge of the electric field vector of the light to be emitted is illustrated, with an electric field strength (light intensity) of the linearly polarized light L1, having the polarization direction in the X direction, incident on the polarization modulation element 10 set to 1. The wavelength of the linearly polarized light L1 is 380 nm.

As illustrated in FIG. 8, in the initial alignment state, the nematic liquid crystal 106 of each of the TN cells 110 to 140 is twist-aligned. The nematic liquid crystal 106 of the TN cells 110 to 140 are twisted in the same direction, and the sum of the twist angles α is 90°. By setting the refractive index anisotropy Δn and the cell thickness of the nematic liquid crystal 106 as described above, when the linearly polarized light L1 enters the polarization modulation element 10, the polarization modulation element 10 rotates the polarization direction of the linearly polarized light L1 90° at the predetermined wavelength, and emits the emission light L2 that has the polarization direction in the Y direction.

In the ON state (in the state in which the predetermined voltage is applied between the light-transmitting electrode 102b of the light incident-side substrate 102 and the light-transmitting electrode 104b of the light emitting-side substrate 104), as illustrated in FIG. 9, the nematic liquid crystal 106 of each of the TN cells 110 to 140, with the exception of the liquid crystal molecules 106M near the interface between the nematic liquid crystal 106 and the light incident-side substrate 102 or the light emitting-side substrate 104, is aligned perpendicular to the light incident-side substrate 102 or the light emitting-side substrate 104. In this case, as illustrated in FIG. 10, the emission light L12 emitted from the second TN cell 120 becomes elliptically polarized light that is close to circularly polarized light, due to the residual birefringence of the nematic liquid crystal 106 in the TN cell 110 and the TN cell 120.

In the present embodiment, the alignment axis direction 224 of the light emitting-side substrate 104 of the TN cell 120 and the alignment axis direction 232 of the light incident-side substrate 102 of the TN cell 130 are orthogonal to each other and, as such, the residual birefringence of the nematic liquid crystal 106 in the TN cell 110 and the TN cell 120 is canceled out by the residual birefringence of the nematic liquid crystal 106 in the TN cell 130. Accordingly, as illustrated in FIG. 11, the emission light L13 emitted from the third TN cell 130 becomes elliptically polarized light that is close to linearly polarized light that has the polarization direction in the X direction. Furthermore, as illustrated in FIG. 12, the emission light L2 is emitted from the polarization modulation element 10 (the TN cell 140) as elliptically polarized light that is close to linearly polarized light that has the polarization direction in the X direction.

Here, polarization contrast pCR is defined. The term "polarization contrast pCR" refers to a ratio of a transmitted light intensity I2 in a case in which the emission light L2 is caused to transmit through an analyzer having a transmission axis parallel to the desired polarization direction of the polarized component, to a transmitted light intensity I1 in a case in which the emission light L2 is caused to transmit through an analyzer having a transmission axis perpendicular to the desired polarization direction of the polarized component. The polarization contrast pCR is expressed as pCR=I2/I1. Higher polarization contrasts pCR indicate higher intensities of the polarized component having the desired polarization direction.

Figure 13:
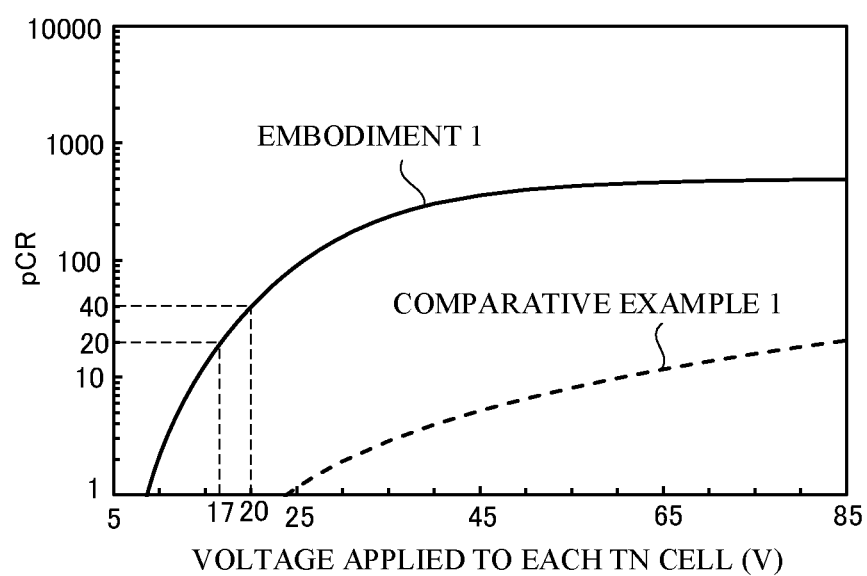
FIG. 13 is a drawing illustrating the relationship between voltage to be applied to each of the TN cells and a polarization contrast, according to Embodiment 1.

In the ON state, the polarization modulation element 10 maintains the polarization direction of the linearly polarized light L1 and attempts to emit the emission light L2 and, as such, the desired polarization direction of the polarized component in the ON state is the X direction. In the present embodiment, as illustrated in FIG. 12, elliptically polarized light that is close to the linearly polarized light that has the polarization direction in the X direction, is emitted from the polarization modulation element 10 as the emission light L2 and, as such, the polarization contrast pCR of the polarization modulation element 10 in the ON state is high. For example, as illustrated in FIG. 13, the polarization contrast pCR of the polarization modulation element 10 in a state in which 20V is applied to each of the TN cells 110 to 140 is 40. Additionally, it is sufficient to apply 17V to each of the TN cells 110 to 140 in order to set the polarization contrast pCR to 20.

Figure 14:
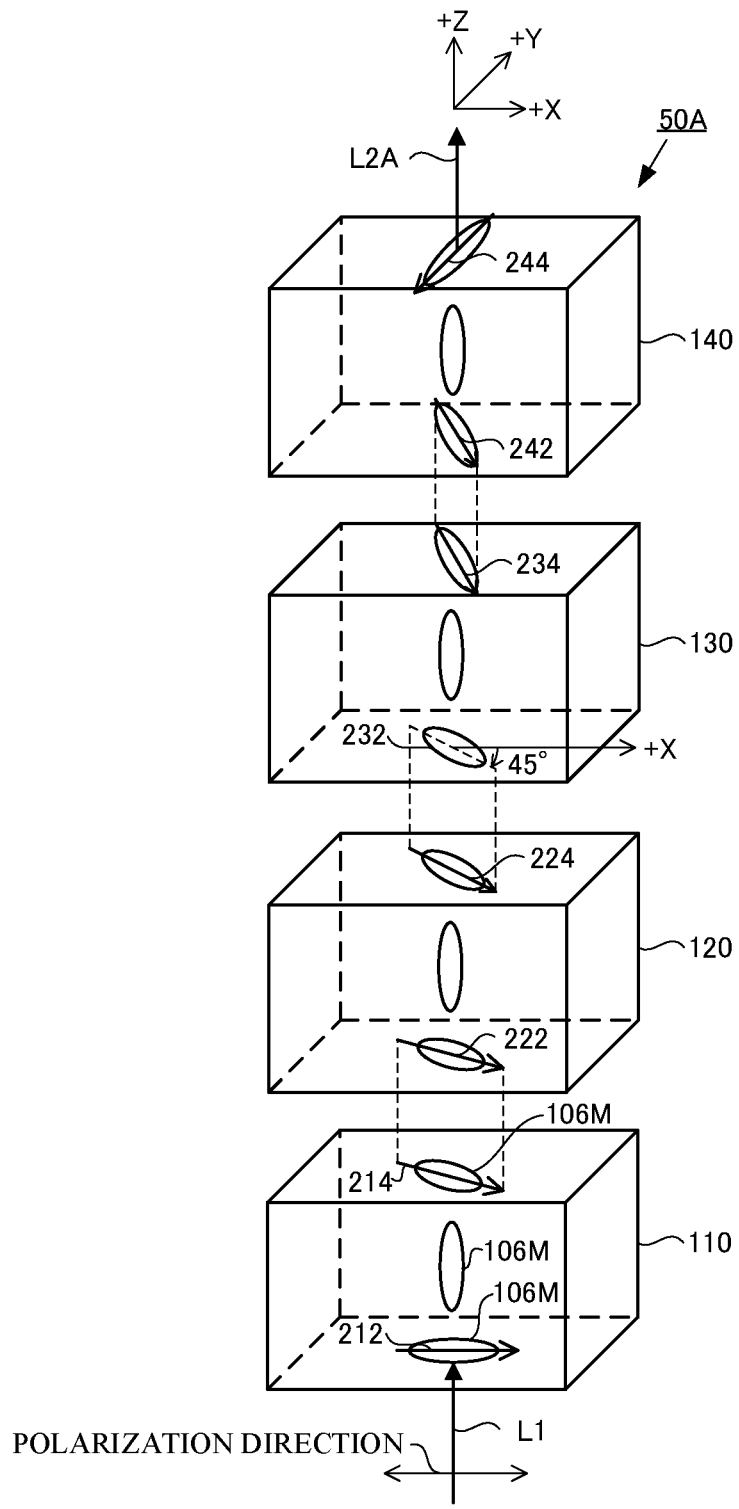
FIG. 14 is a schematic drawing illustrating the alignment state of the nematic liquid crystal of a polarization modulation element according to Comparative Example 1, in the ON state.
Figure 15:
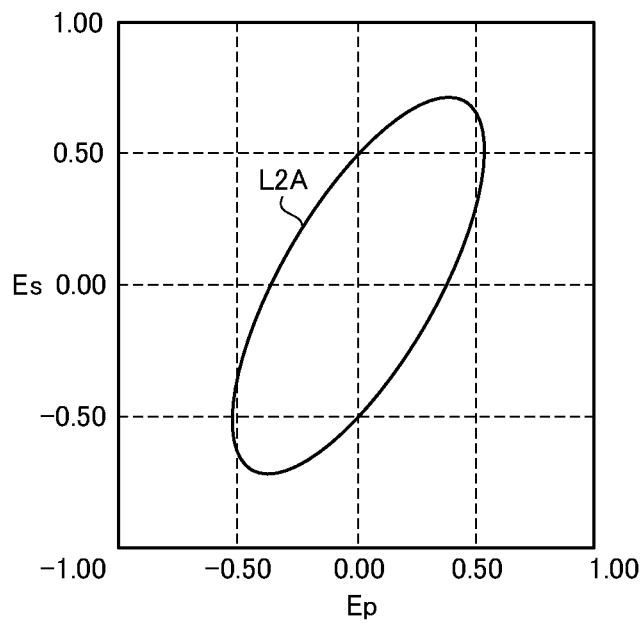
FIG. 15 is a drawing illustrating the polarization state of the emission light emitted in the ON state, according to Comparative Example 1.

Meanwhile, in a polarization modulation element 50A (Comparative Example 1, FIG. 14) in which the alignment axis direction 232 of the TN cell 130 matches the alignment axis direction 224 of the TN cell 120, in the ON state (20V), when the linearly polarized light L1 enters the polarization modulation element 50A, emission light L2A illustrated in FIG. 15 is emitted. The emission light L2A is closer to circularly emission light than the emission light L2 of the polarization modulation element 10, and is inclined more to the Y direction side than the emission light L2 of the polarization modulation element 10. Due to this, in the polarization modulation element 50A of Comparative Example 1, the polarization contrast pCR is low (polarization contrast pCR=0.5), and it is not possible to sufficiently obtain a polarized component having a desired polarization direction. Additionally, as illustrated in FIG. 13, the polarization modulation element 50A of Comparative Example 1 requires an extremely high voltage to obtain a polarization contrast pCR equivalent to that obtained with the polarization modulation element 10.

Note that, in the polarization modulation element 50A of Comparative Example 1, the alignment axis direction 232 of the third TN cell 130 is, as illustrated in FIG. 14, inclined 45° clockwise with respect to the +X direction, and matches the alignment axis direction 224 of the TN cell 120. Additionally, in the polarization modulation element 50A of Comparative Example 1, the alignment axis direction 242 of the fourth TN cell 140 matches the alignment axis direction 234 of the third TN cell 130, and the alignment axis direction 244 of the fourth TN cell 140 is the −Y direction. The other configurations of the polarization modulation element 50A of Comparative Example 1 are the same as those of the polarization modulation element 10.

Thus, with the polarization modulation element 10, in the second TN cell 120 and the third TN cell 130 that are adjacent, the alignment axis direction 224 of the light emitting-side substrate 104 of the TN cell 120 and the alignment axis direction 232 of the light incident-side substrate 102 of the TN cell 130 are orthogonal to each other and, as such, the polarization modulation element 10 can emit, with low voltage and at high intensity, a polarized component having a desired polarization direction.

Embodiment 2

In Embodiment 1, the polarization modulation element 10 includes four of the TN cells 100. It is sufficient that the polarization modulation element 10 includes N of the TN cells 100 (where N is an integer of 3 or greater). In the present embodiment, a polarization modulation element 10 that includes three of the TN cells 100 is described.

Figure 16:
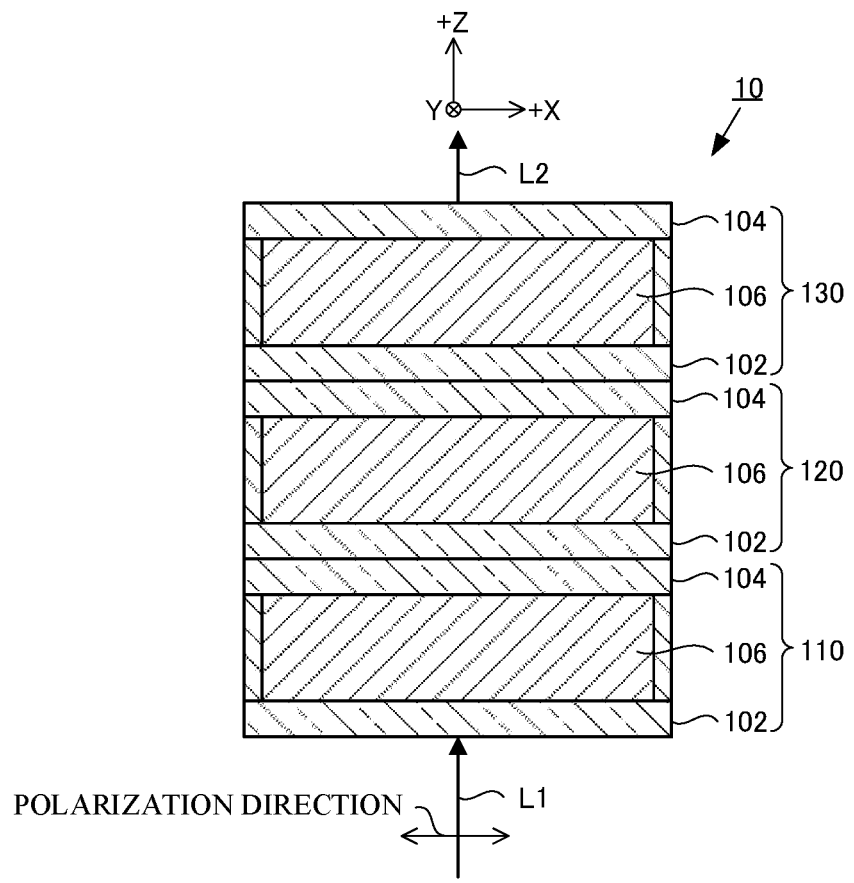
FIG. 16 is a schematic drawing illustrating a cross-section of a polarization modulation element according to Embodiment 2.

As illustrated in FIG. 16, the polarization modulation element 10 of the present embodiment includes three TN cells 110 to 130 for which the twist direction is identical. The TN cells 110 to 130 are sequentially stacked. With the exception of the cell thickness (5.42 μm) and the alignment axis direction 200, the configurations of the TN cells 110 to 130 of the present embodiment are the same as those of the TN cells 100 of Embodiment 1.

Figure 17:
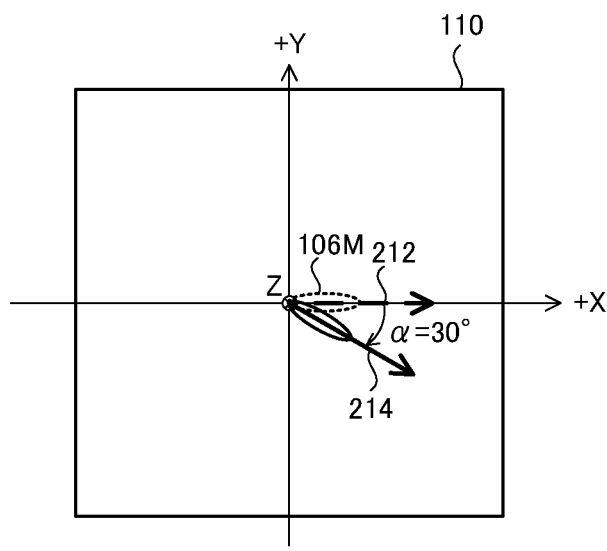
FIG. 17 is a drawing illustrating an alignment axis direction and an alignment of a nematic liquid crystal of a first TN cell according to Embodiment 2.
Figure 18:
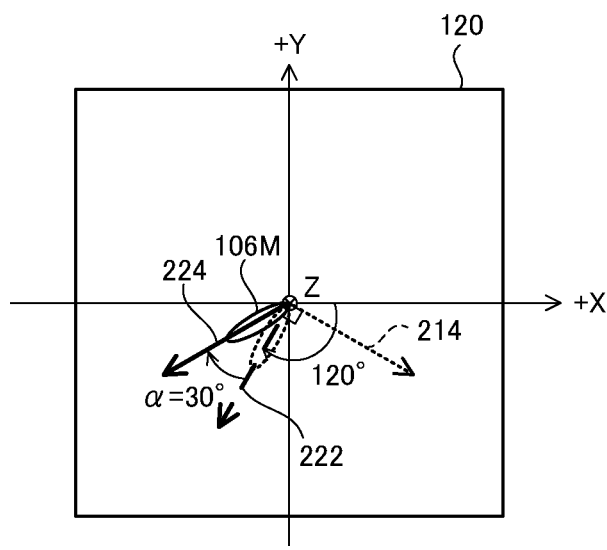
FIG. 18 is a drawing illustrating the alignment axis direction and the alignment of the nematic liquid crystal of a second TN cell according to Embodiment 2.
Figure 19:
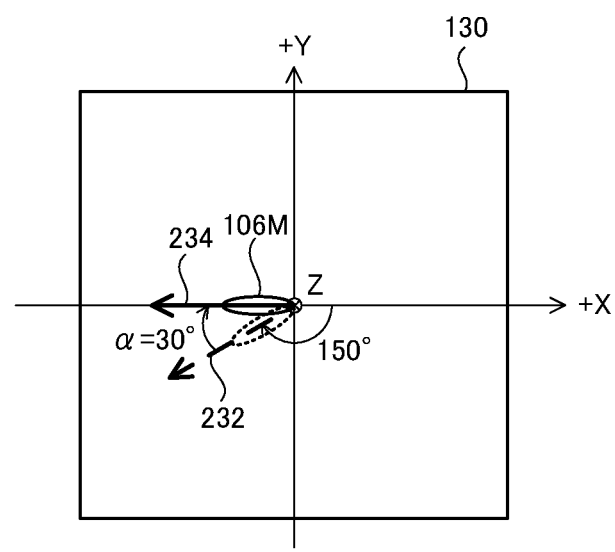
FIG. 19 is a drawing illustrating the alignment axis direction and the alignment of the nematic liquid crystal of a third TN cell according to Embodiment 2.

As illustrated in FIGS. 17 to 19, in the initial alignment state, the nematic liquid crystal 106 of the TN cells 110 to 130 of the present embodiment are aligned twisted clockwise when viewed from above from the +Z side. The twist angle α (the twist angle of the nematic liquid crystal 106) of the TN cells 110 to 130 is 30°, and a sum of the twist angles α of each of the TN cells 110 to 130 is 90°. As with the TN cells 100 of Embodiment 1, the alignment axis directions 200 of the TN cells 110 to 130 of the present embodiment differ.

As illustrated in FIG. 17, the alignment axis direction 212 of the light incident-side substrate 102 of the first TN cell 110 is the +X direction. The alignment axis direction 214 of the light emitting-side substrate 104 of the TN cell 110 is inclined 30° clockwise with respect to the +X direction.

As illustrated in FIG. 18, the alignment axis direction 222 of the light incident-side substrate 102 of the second TN cell 120 is inclined 120° clockwise with respect to the +X direction, and is orthogonal to the alignment axis direction 214 of the light emitting-side substrate 104 of the TN cell 110. The alignment axis direction 224 of the light emitting-side substrate 104 of the TN cell 120 is inclined 150° clockwise with respect to the +X direction.

As illustrated in FIG. 19, the alignment axis direction 232 of the light incident-side substrate 102 of the third TN cell 130 is inclined 150° clockwise with respect to the +X direction, and matches the alignment axis direction 224 of the light emitting-side substrate 104 of the TN cell 120. The alignment axis direction 234 of the light emitting-side substrate 104 of the TN cell 130 is rotated 180° clockwise with respect to the +X direction.

Figure 20:
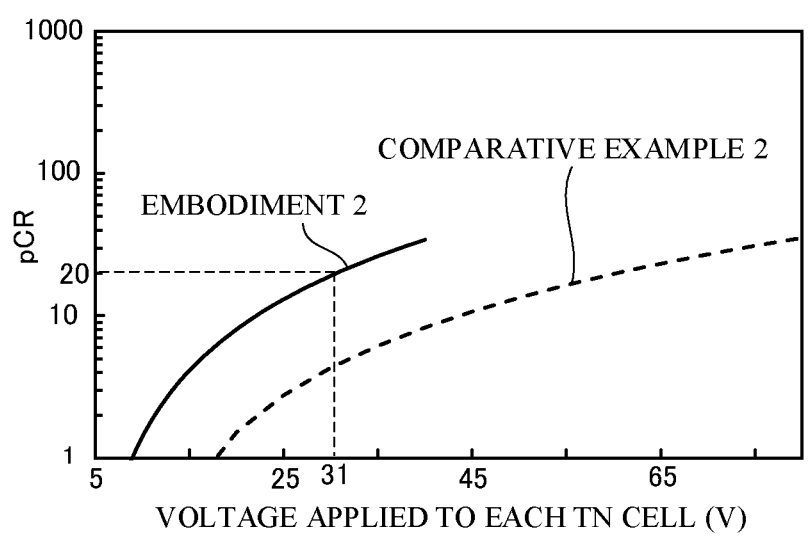
FIG. 20 is a drawing illustrating the relationship between voltage to be applied to each of the TN cells and a polarization contrast according to Embodiment 2.

FIG. 20 illustrates the relationship, in the ON state, between the voltage to be applied to each of the TN cells 110 to 130, and the polarization contrast pCR of the polarization modulation element 10 of the present embodiment and the polarization contrast pCR of a polarization modulation element of Comparative Example 2. As with the polarization modulation element 10 of the present embodiment, the polarization modulation element of Comparative Example 2 includes three TN cells 110 to 130. In the polarization modulation element of Comparative Example 2, the alignment axis direction 222 of the TN cell 120 matches the alignment axis direction 214 of the TN cell 110. Specifically, the alignment axis direction 222 of the second TN cell 120 is inclined 30° clockwise with respect to the +X direction, and matches the alignment axis direction 214 of the TN cell 110. Additionally, in the polarization modulation element of Comparative Example 2, the alignment axis direction 232 of the third TN cell 130 matches the alignment axis direction 224 of the TN cell 120, and the alignment axis direction 234 of the third TN cell 130 is the −Y direction. The other configurations of the polarization modulation element of Comparative Example 2 are the same as those of the polarization modulation element 10 of the present embodiment.

As illustrated in FIG. 20, with the polarization modulation element 10 of the present embodiment, it is possible to obtain a high polarization contrast pCR with low voltage. That is, the polarization modulation element 10 of the present embodiment can emit, with high intensity and low voltage, a polarized component having a desired polarization direction. For example, it is sufficient to apply 31V to each of the TN cells 110 to 130 in order to set the polarization contrast pCR to 20.

Figures 21, 22:
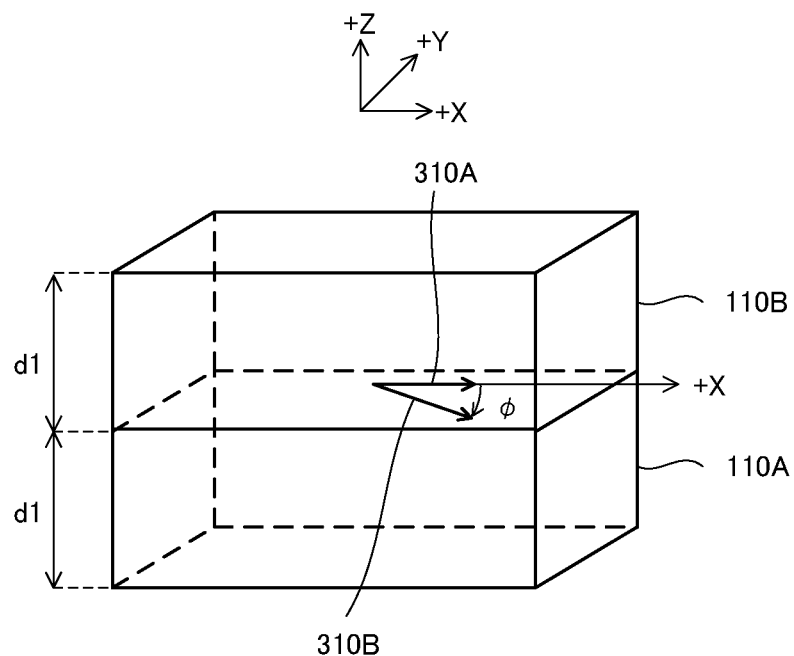
FIG. 21 is a drawing illustrating the polarization contrast and an optimal voltage according to Embodiment 2.
FIG. 22 is a schematic drawing illustrating a birefringent plate according to Embodiment 2.

Furthermore, with the polarization modulation element 10 of the present embodiment, it is possible to obtain a high polarization contrast pCR with lower voltage by optimizing the voltage to be applied to the TN cells 110 to 130. For example, as illustrated in FIG. 21, it is sufficient to apply 14.4V to the TN cell 110 and the TN cell 120, and 6.1V to the TN cell 130 in order to set the polarization contrast pCR to 20. Next, a method for calculating the optimal voltage is described.

Figure 23:
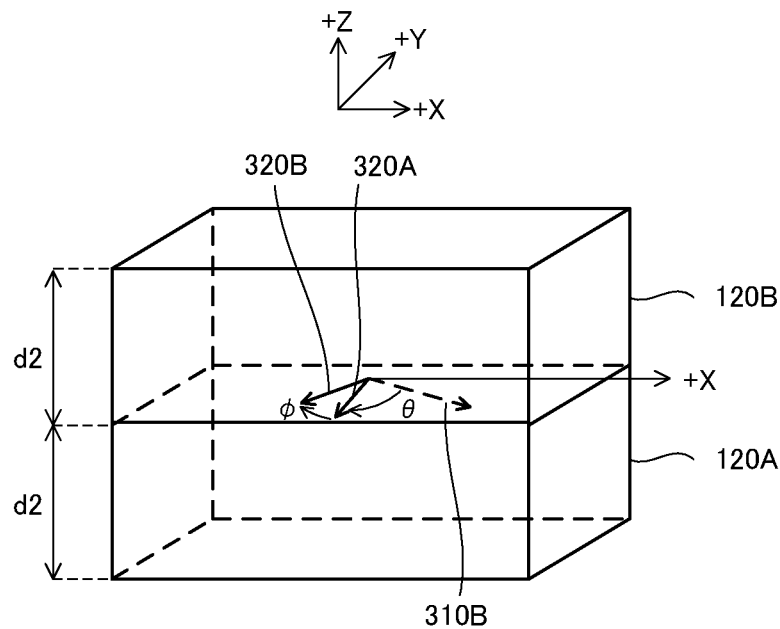
FIG. 23 is a schematic drawing illustrating the birefringent plate according to Embodiment 2.
Figure 24:
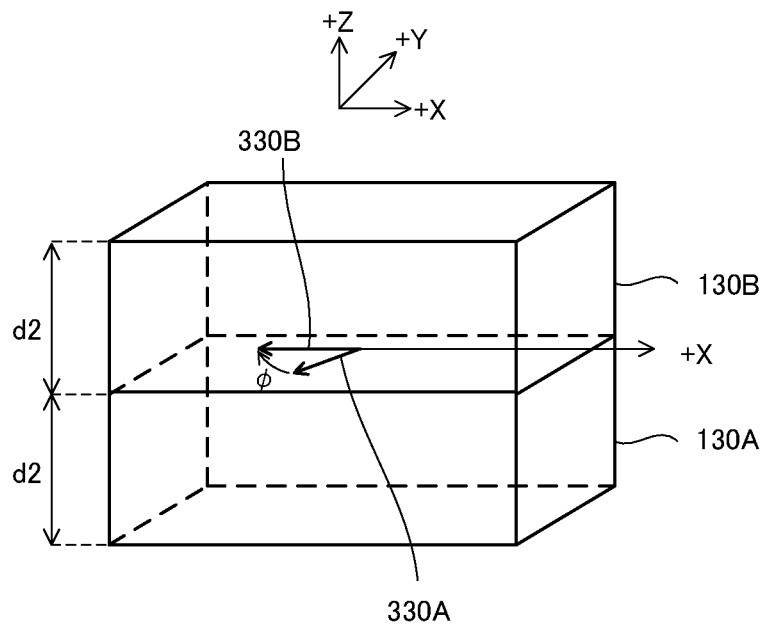
FIG. 24 is a schematic drawing illustrating the birefringent plate according to Embodiment 2.

Firstly, each of the TN cells 110 to 130 is modeled as two birefringent plates. Specifically, as illustrated in FIG. 22, the TN cell 110 to which voltage is applied is modeled as a birefringent plate 110A that has an optical axis 310A in the alignment axis direction 212 of the light incident-side substrate 102, and a birefringent plate 110B that has an optical axis 310B in the alignment axis direction 214 of the light emitting-side substrate 104. Additionally, as illustrated in FIG. 23, the TN cell 120 to which voltage is applied is modeled as a birefringent plate 120A that has an optical axis 320A in the alignment axis direction 222 of the light incident-side substrate 102, and a birefringent plate 120B that has an optical axis 320B in the alignment axis direction 224 of the light emitting-side substrate 104. Furthermore, as illustrated in FIG. 24, the TN cell 130 to which voltage is applied is modeled as a birefringent plate 130A that has an optical axis 330A in the alignment axis direction 232 of the light incident-side substrate 102, and a birefringent plate 130B that has an optical axis 330B in the alignment axis direction 234 of the light emitting-side substrate 104.

Here, a voltage V1 is applied to the TN cell 110, a voltage V2 is applied to the TN cell 120 and the TN cell 130, a thickness of the birefringent plates 110A, 110B is defined as d1, a thickness of the birefringent plates 120A to 130B is defined as d2, and a refractive index anisotropy of the birefringent plates 110A to 130B is defined as Δn. Additionally, when viewed from above from the +Z side, a crossing angle between the optical axis 310A of the birefringent plate 110A and the optical axis 310B of the birefringent plate 110B, a crossing angle between the optical axis 320A of the birefringent plate 120A and the optical axis 320B of the birefringent plate 120B, and a crossing angle between the optical axis 330A of the birefringent plate 130A and the optical axis 330B of the birefringent plate 130B are defined as φ (where φ=30°). Furthermore, a crossing angle between the optical axis 310B of the birefringent plate 110B and the optical axis 320A of the birefringent plate 120A is defined as θ (where θ=90°). Note that the optical axis 320B of the birefringent plate 120B and the optical axis 330A of the birefringent plate 130A match. Additionally, the crossing angle φ corresponds to the twist angle α (where α=30°) of the TN cells 100. The crossing angle θ corresponds to the angle difference of 90° between the alignment axis direction 222 of the light incident-side substrate 102 of the TN cell 120 and the alignment axis direction 214 of the light emitting-side substrate 104 of the TN cell 110.

A Jones matrix of the birefringent plates is expressed by the following Equation (1) and, when viewed from above from the +Z side, the Jones matrix of the birefringent plates, in which the optical axis is inclined the angle φ with respect to the incident light L1 that has the polarization direction in the X direction, is expressed by the following Equation (2). As such, the Jones matrix of each of the birefringent plates 110A to 130B is expressed by the following Equations (3) to (8).

$$W(\Gamma) = \begin{bmatrix} e^{-i\Gamma/2} & 0 \\ 0 & e^{i\Gamma/2} \end{bmatrix} \tag{1}$$

$$W = \begin{bmatrix} \cos\phi & -\sin\phi \\ \sin\phi & \cos\phi \end{bmatrix} \begin{bmatrix} e^{-i\Gamma/2} & 0 \\ 0 & e^{i\Gamma/2} \end{bmatrix} \begin{bmatrix} \cos\phi & \sin\phi \\ -\sin\phi & \cos\phi \end{bmatrix} = R(-\phi)W(\Gamma)R(\phi) \tag{2}$$

$$W = R(0)W(\Gamma 1)R(0) \tag{3}$$

$$W = R(-\phi)W(\Gamma 1)R(\phi) \tag{4}$$

$$W = R(-\phi - \theta)W(\Gamma 2)R(\phi + \theta) \tag{5}$$

$$W = R(-2\phi - \theta)W * \Gamma 2)R(2\phi + \theta) \tag{6}$$

$$W = R(-2\phi - \theta)W(\Gamma 2)R(2\phi + \theta) \tag{7}$$

$$W = R(-3\phi - \theta)W(\Gamma 2)R(3\phi + \theta) \tag{8}$$

The overall Jones matrix of the birefringent plates 110A to 130B (that is, the Jones matrix corresponding to the entire polarization modulation element 10) is expressed by the following Equation (9). Here, Γ1 and Γ2 are expressed by the following Equations (10) and (11). λ is the wavelength of the incident light L1.

$$W = R(-3\phi - \theta)[W(\Gamma 2)R(\phi)W(\Gamma 2)]^2 R(\theta)W(\Gamma 1)R(\phi)W(\Gamma 1) \tag{9}$$

$$\Gamma 1 = \frac{2\pi \Delta n d1}{\lambda} \tag{10}$$

$$\Gamma 2 = \frac{2\pi \Delta n d2}{\lambda} \tag{11}$$

Next, the polarization contrast pCR is expressed using the Jones matrix. When expressing the overall Jones matrix of the birefringent plates 110A to 130B by the following Equation (12), the transmitted light, in a case in which the emission light L2 is caused to transmit through an analyzer having a transmission axis perpendicular to the desired polarization direction (the X direction) of the polarized component, is expressed by the following Equation (13), and the transmitted light intensity I1 is expressed by the following Equation (14). Here, the symbol "*" represents a complex conjugate.

$$W = \begin{bmatrix} W_1 & W_2 \\ W_3 & W_4 \end{bmatrix} \quad (12)$$

$$\begin{bmatrix} E_{x1} \\ E_{y1} \end{bmatrix} = \begin{bmatrix} 0 & 0 \\ 0 & 1 \end{bmatrix} \begin{bmatrix} W_1 & W_2 \\ W_3 & W_4 \end{bmatrix} \begin{bmatrix} 1 \\ 0 \end{bmatrix} = \begin{bmatrix} 0 \\ W_3 \end{bmatrix} \quad (13)$$

$$I1 = \left\| \begin{bmatrix} 0 \\ W_3 \end{bmatrix} \right\|^2 = W_3 \cdot W_3^* \quad (14)$$

The transmitted light, in a case in which the emission light L2 is caused to transmit through an analyzer having a transmission axis parallel to the desired polarization direction (the X direction) of the polarized component, is expressed by the following Equation (15), and the transmitted light intensity I2 is expressed by the following Equation (16).

$$\begin{bmatrix} E_{x2} \\ E_{y2} \end{bmatrix} = \begin{bmatrix} 1 & 0 \\ 0 & 0 \end{bmatrix} \begin{bmatrix} W_1 & W_2 \\ W_3 & W_4 \end{bmatrix} \begin{bmatrix} 1 \\ 0 \end{bmatrix} = \begin{bmatrix} W_1 \\ 0 \end{bmatrix} \quad (15)$$

$$I2 = \left\| \begin{bmatrix} W_1 \\ 0 \end{bmatrix} \right\|^2 = W_1 \cdot W_1^* \quad (16)$$

The polarization contrast pCR is expressed, on the basis of Equations (9) to (11), (14), and (16), by the following Equations (17) and (18).

$$pCR = \frac{I2}{I1} = -\frac{J+14}{J-18} \quad (17)$$

$$J = 9\cos\left(\frac{6\pi\Delta nd2 - 2\pi\Delta nd1}{\lambda}\right) - 3\cos\left(\frac{2\pi\Delta nd2 + 2\pi\Delta nd1}{\lambda}\right) + 6\cos\left(\frac{2\pi\Delta nd2 - 2\pi\Delta nd1}{\lambda}\right) + 6\cos\left(\frac{4\pi\Delta nd2}{\lambda}\right) \quad (18)$$

Meanwhile, the relationship between the voltage V to be applied to the TN cells 100 and the residual birefringence Δnd in the TN cells 100 in the ON state is obtained as follows.

Figure 25:
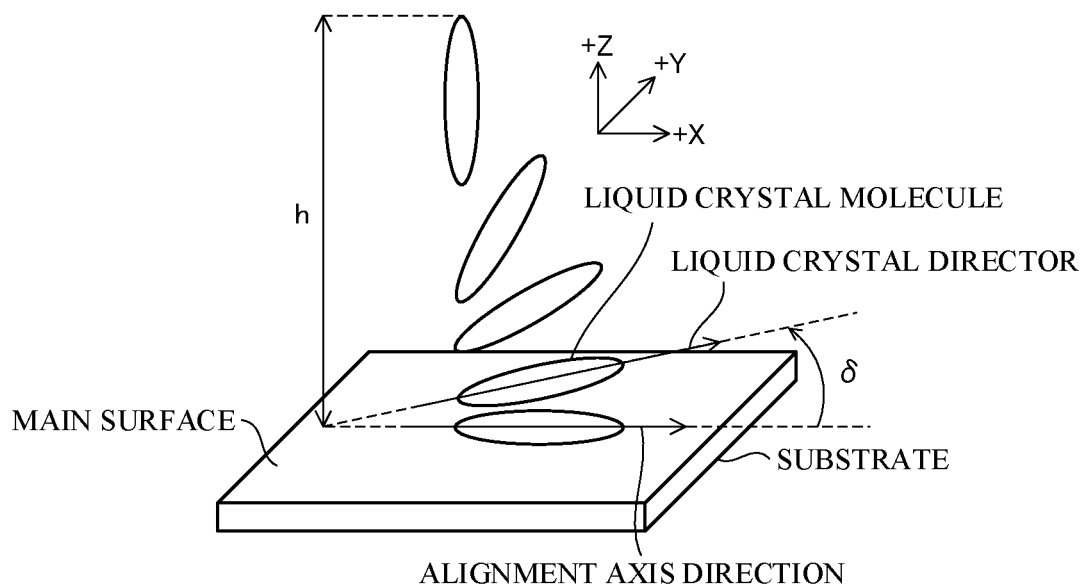
FIG. 25 is a schematic drawing illustrating an alignment model according to Embodiment 2.

Firstly, as illustrated in FIG. 25, an alignment model is set in which, as the thickness h from the substrate to the main surface increases, the angle δ of the liquid crystal director relative to the main surface of the substrate increases. When no is the ordinary light refractive index of the liquid crystal, $n_e$ is the extraordinary light refractive index, $n_{eff}$ (x, y, z) is the refractive index in the alignment axis direction of the liquid crystal at a position (x, y, z), M is a number of divisions into which the interior of the thickness h is divided into a plurality of regions in the thickness direction, $\Delta n_i$ is the refractive index anisotropy (phase difference) of the divided ith region, Δn (x, y, z) is the refractive index anisotropy (phase difference) at the position (x, y, z), and d is the cell thickness of the TN cells 100, the birefringence Δnd is expressed by the following Equations (19) to (21).

$$n_{eff}(x, y, z) = \frac{n_o n_e}{\sqrt{n_e^2 \sin^2\delta + n_o^2 \cos^2\delta}} \quad (19)$$

$$\Delta n(x, y, z) = n_{eff}(x, y, z) - n_0 \quad (20)$$

$$\Delta nd(x, y) = \sum_{i=1}^{M} \Delta n_i \frac{h}{M} \quad (21)$$

Figure 26:
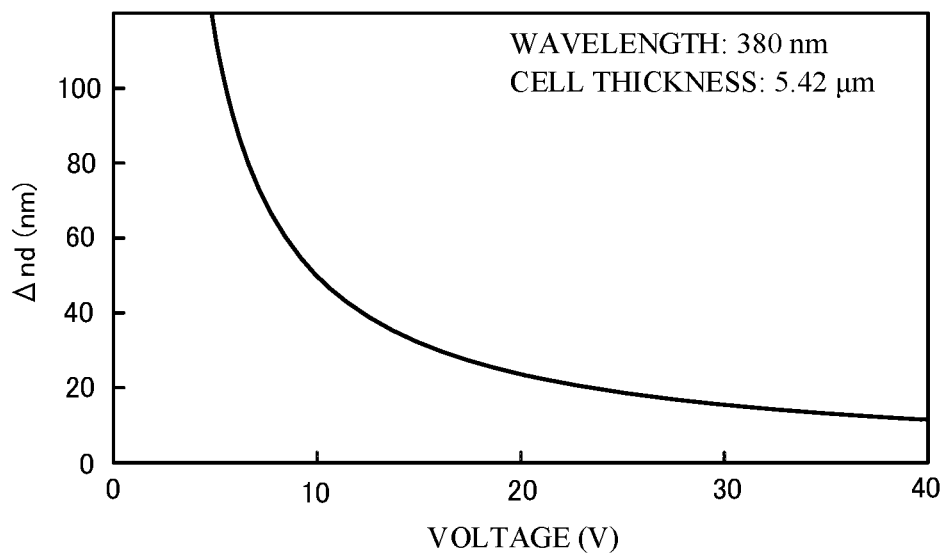
FIG. 26 is a drawing illustrating the relationship between the voltage to be applied to the TN cells and residual birefringence in the TN cell in the ON state, according to Embodiment 2.

In one example, the relationship between the voltage V to be applied and the angle δ of the liquid crystal director relative to the main surface of the substrate is obtained by a liquid crystal simulator (LCD master, manufactured by Shintech). The relationship, illustrated in FIG. 26, for example, between the voltage V to be applied to the TN cells 100 and the residual birefringence Δnd in the TN cells 100 in the ON state is obtained from the obtained relationship between the voltage V to be applied and the angle δ of the liquid crystal director relative to the main surface of the substrate, and Equations (19) to (21).

The optimal voltage to be applied to the TN cells 110 to 130 can be obtained by obtaining, from the relationship between the voltage V to be applied and the residual birefringence Δnd in the TN cells 100 in the ON state, and Equations (17) and (18), a combination whereby the set polarization contrast pCR is satisfied, and the sum of the voltage V1 to be applied to the TN cell 110 and the voltage V2 to be applied to the TN cell 120 and the TN cell 130 is smallest.

Thus, with the polarization modulation element 10 of the present embodiment, in the first TN cell 110 and the second TN cell 120 that are adjacent, the alignment axis direction 214 of the light emitting-side substrate 104 of the TN cell 110 and the alignment axis direction 222 of the light incident-side substrate 102 of the TN cell 120 are orthogonal to each other and, as such, the polarization modulation element 10 can emit, with low voltage and at high intensity, a polarized component having a desired polarization direction. Furthermore, it is possible to obtain a high polarization contrast pCR with lower voltage by optimizing the voltages V1, V2 to be applied to the TN cells 110 to 130. That is, by optimizing the voltages V1, V2 to be applied to the TN cells 110 to 130, the polarization modulation element 10 of the present embodiment can emit, at high intensity and with lower voltage, a polarized component having a desired polarization direction.

Embodiment 3

In Embodiment 1, in one of the TN cells 100 (the second TN cell 120 and the third TN cell 130) that are adjacent, the alignment axis direction 200 of the light emitting-side substrate 104 and the alignment axis direction 200 of the light incident-side substrate 102 are orthogonal to each other. It is sufficient that, in the polarization modulation element 10, in at least one of the TN cells 100 that are adjacent, the alignment axis direction 200 of the light emitting-side substrate 104 and the alignment axis direction 200 of the light incident-side substrate 102 are orthogonal to each other.

As with the polarization modulation element 10 of Embodiment 1, the polarization modulation element 10 of the present embodiment includes the TN cells 110 to 140 that are stacked. In the polarization modulation element 10 of the present embodiment, in two of the TN cells 100 (the first TN cell 110 and the second TN cell 120, and the third TN cell 130 and the fourth TN cell 140) that are adjacent, the alignment axis direction 200 of the light emitting-side substrate 104 and the alignment axis direction 200 of the light incident-side substrate 102 are orthogonal to each other. With the exception of the alignment axis direction 200, the configurations of the TN cells 110 to 140 of the present embodiment are the same as the TN cells 110 to 140 of Embodiment 1.

As with the TN cell 110 of Embodiment 1, in the TN cell 110 of the present embodiment, the alignment axis direction 212 of the light incident-side substrate 102 is the +X direction. Additionally, the alignment axis direction 214 of the light emitting-side substrate 104 is inclined 22.5° clockwise with respect to the +X direction.

Figure 27:
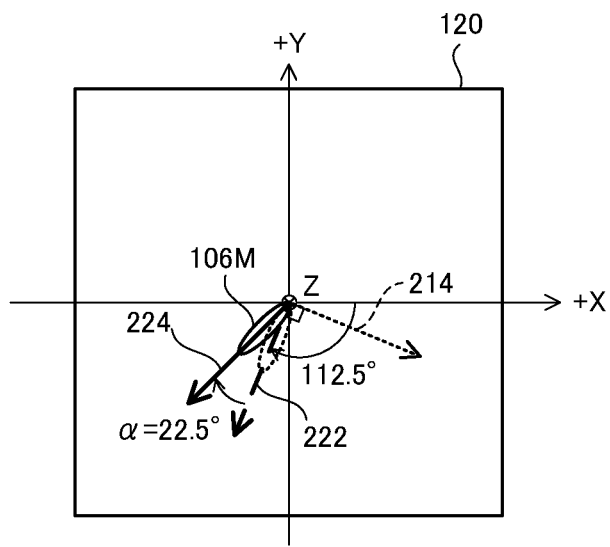
FIG. 27 is a drawing illustrating an alignment axis direction and an alignment of a nematic liquid crystal of a second TN cell according to Embodiment 3.

As illustrated in FIG. 27, in the TN cell 120 of the present embodiment, the alignment axis direction 222 of the light incident-side substrate 102 is inclined 112.5° clockwise with respect to the +X direction, and is orthogonal to the alignment axis direction 214 of the light emitting-side substrate 104 of the TN cell 110. The alignment axis direction 224 of the light emitting-side substrate 104 is inclined 135° clockwise with respect to the +X direction.

Figure 28:
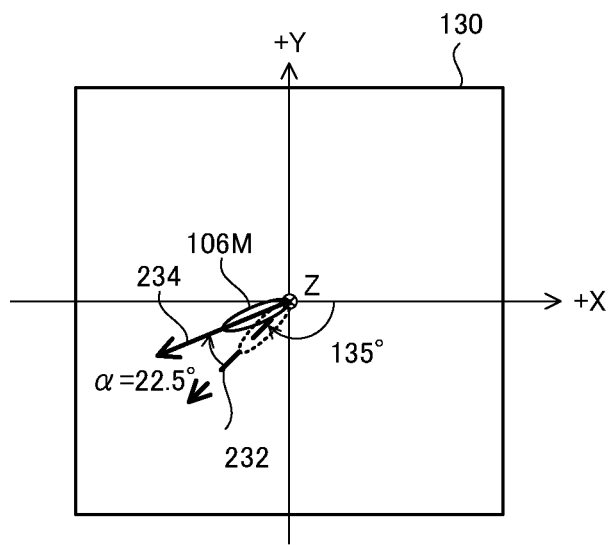
FIG. 28 is a drawing illustrating the alignment axis direction and the alignment of the nematic liquid crystal of a third TN cell according to Embodiment 3.

As illustrated in FIG. 28, in the TN cell 130 of the present embodiment, the alignment axis direction 232 of the light incident-side substrate 102 is inclined 135° clockwise with respect to the +X direction, and matches the alignment axis direction 224 of the light emitting-side substrate 104 of the TN cell 120. The alignment axis direction 234 of the light emitting-side substrate 104 is inclined 157.5° clockwise with respect to the +X direction.

Figure 29:
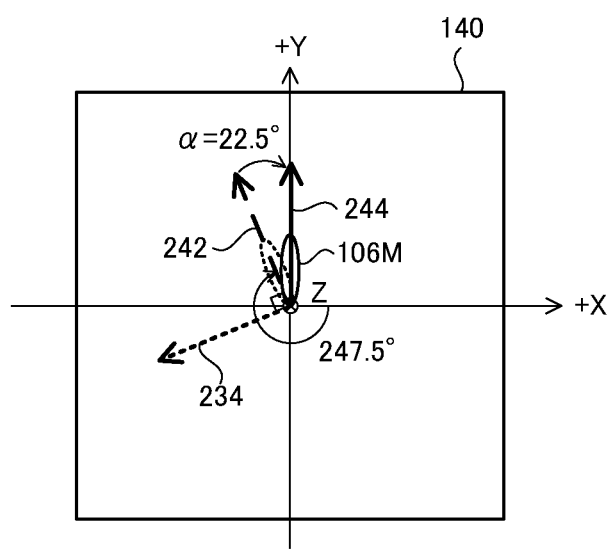
FIG. 29 is a drawing illustrating the alignment axis direction and the alignment of the nematic liquid crystal of a fourth TN cell according to Embodiment 3.

As illustrated in FIG. 29, in the TN cell 140 of the present embodiment, the alignment axis direction 242 of the light incident-side substrate 102 is rotated 247.5° clockwise with respect to the +X direction, and is orthogonal to the alignment axis direction 234 of the light emitting-side substrate 104 of the TN cell 130. The alignment axis direction 244 of the light emitting-side substrate 104 is rotated 270° clockwise with respect to the +X direction.

Figure 30:
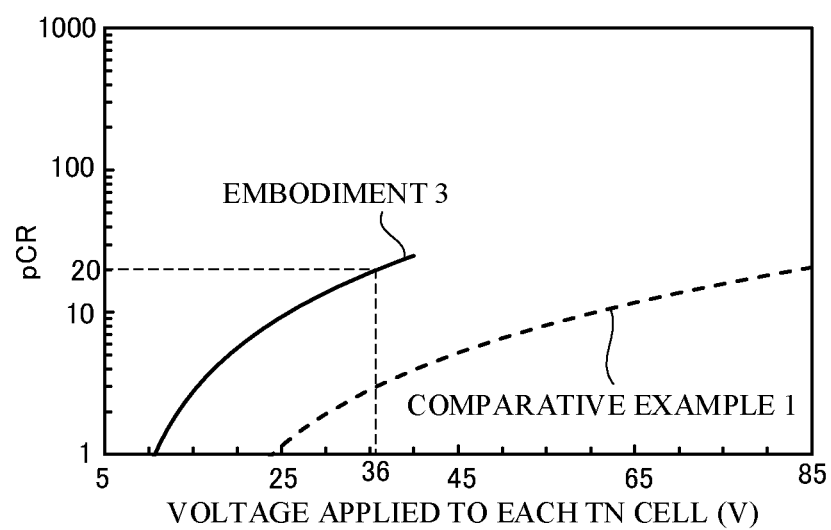
FIG. 30 is a drawing illustrating the relationship between voltage to be applied to each of the TN cells and a polarization contrast according to Embodiment 3.

FIG. 30 illustrates the relationship, in the ON state, between the voltage to be applied to each of the TN cells 110 to 140, and the polarization contrast pCR of the polarization modulation element 10 of the present embodiment and the polarization contrast pCR of a polarization modulation element of Comparative Example 1. As illustrated in FIG. 30, with the polarization modulation element 10 of the present embodiment, it is possible to obtain a high polarization contrast pCR with low voltage. That is, the polarization modulation element 10 of the present embodiment can emit, at high intensity and with low voltage, a polarized component having a desired polarization direction. For example, it is sufficient to apply 36V to each of the TN cells 110 to 140 in order to set the polarization contrast pCR to 20.

Furthermore, as with the polarization modulation element 10 of Embodiment 2, with the polarization modulation element 10 of the present embodiment, it is possible to obtain a high polarization contrast pCR with lower voltage by optimizing the voltage to be applied to the TN cells 110 to 140. For example, as illustrated in FIG. 31, it is sufficient to apply 5.4V to the TN cell 110, 11.8V to the TN cell 120 and the TN cell 130, and 5.9V to the TN cell 140 in order to set the polarization contrast pCR to 20. When the voltage to be applied to the TN cells 110 to 140 is optimized, it is possible to obtain a high polarization contrast pCR with lower voltage than with the polarization modulation element 10 of Embodiment 1. The optimal voltage of the present embodiment can be obtained by the same method as for the optimal voltage of Embodiment 2.

Thus, with polarization modulation element 10 of the present embodiment, in two of the TN cells 100 that are adjacent, the alignment axis direction 200 of the light emitting-side substrate 104 and the alignment axis direction 200 of the light incident-side substrate 102 are orthogonal to each other, and a polarized component having a desired polarization direction can be emitted with low voltage and at high intensity. Furthermore, by optimizing the voltages to be applied to the TN cells 100, the polarization modulation element 10 of the present embodiment can emit, with lower voltage and at high intensity, a polarized component having a desired polarization direction.

Embodiment 4

In Embodiments 1 and 3, the polarization modulation element 10 includes four of the TN cells 100. However, a configuration is possible in which the polarization modulation element 10 includes 6 (N=6) of the TN cells 100.

The polarization modulation element 10 of the present embodiment includes six of the TN cells 100 for which the twist direction is identical. The TN cells 100 of the present embodiment are sequentially stacked with the light incident-side substrate 102 of one of the TN cells 100 and the light emitting-side substrate 104 of another of the TN cells 100 opposing each other. With the exception of the cell thickness (3.65 μm) and the alignment axis direction 200, the configurations of the TN cells 100 of the present embodiment are the same as those of the TN cells 100 of Embodiment 1.

In the initial alignment state, the nematic liquid crystal 106 of the TN cells 100 of the present embodiment are aligned twisted clockwise when viewed from above from the +Z side. The twist angle α (the twist angle of the nematic liquid crystal 106) of the TN cells 100 is 15°, and the sum of the twist angles α of each of the TN cells 100 is 90°.

FIG. 32 illustrates the alignment axis direction 200 of the TN cells 100 of the present embodiment. As illustrated in FIG. 32, in the present embodiment, in the third (N/2$^{th}$) TN cell 100 and the fourth ((N/2)+1$^{th}$) TN cell 100, the alignment axis direction 200 of the light emitting-side substrate 104 and the alignment axis direction 200 of the light incident-side substrate 102 are orthogonal to each other. In the other adjacent TN cells 100, the alignment axis direction 200 of the light emitting-side substrate 104 and the alignment axis direction 200 of the light incident-side substrate 102 match.

Figures 33, 34:
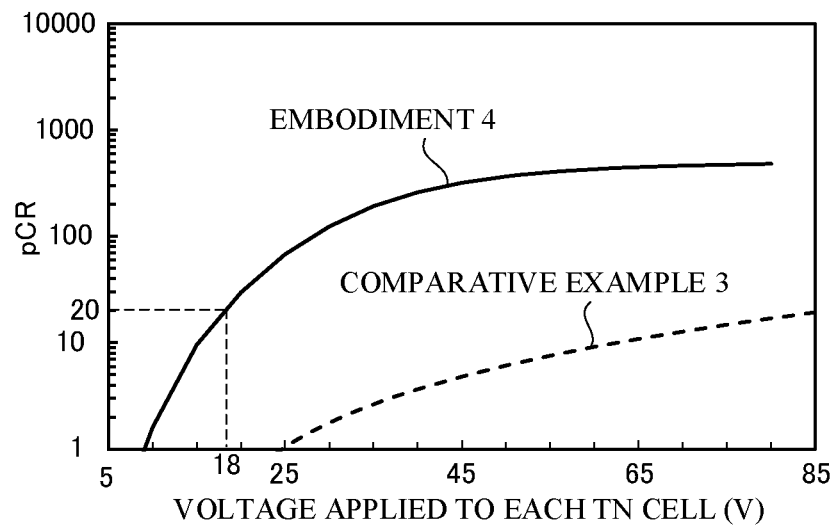
FIG. 33 is a drawing illustrating the relationship between voltage to be applied to each of the TN cells and a polarization contrast according to Embodiment 4.
FIG. 34 is a drawing illustrating an alignment axis direction of TN cells according to Embodiment 5.

FIG. 33 illustrates the relationship between the voltage to be applied to each of the TN cells 100, and the polarization contrast pCR of the polarization modulation element 10 of the present embodiment and the polarization contrast pCR of a polarization modulation element of Comparative Example 3. As illustrated in FIG. 33, with the polarization modulation element 10 of the present embodiment, it is possible to obtain a high polarization contrast pCR with low voltage. For example, it is sufficient to apply 18V to each of the TN cells 100 in order to set the polarization contrast pCR to 20.

Note that, as with the polarization modulation element 10 of the present embodiment, the polarization modulation element of Comparative Example 3 includes six of the TN cells 100 for which the twist direction is identical (twist angle α=15°). With the polarization modulation element of Comparative Example 3, in any of the TN cells 100 that are adjacent, the alignment axis direction 200 of the light emitting-side substrate 104 and the alignment axis direction 200 of the light incident-side substrate 102 match. The other configurations of the polarization modulation element of Comparative Example 3 are the same as those of the polarization modulation element 10 of the present embodiment.

Thus, in the present embodiment as well, it is possible to obtain a high polarization contrast pCR with low voltage. Accordingly, the polarization modulation element 10 of the present embodiment can emit, at high intensity and with low voltage, a polarized component having a desired polarization direction.

Embodiment 5

In Embodiment 4, in one of the TN cells 100 (the third TN cell 100 and the fourth TN cell 100), the alignment axis direction 200 of the light emitting-side substrate 104 and the alignment axis direction 200 of the light incident-side substrate 102 are orthogonal to each other. However, a configuration is possible in which, in the polarization modulation element 10 including six of the TN cells 100 (N=6), in two of the TN cells 100 that are adjacent, the alignment axis direction 200 of the light emitting-side substrate 104 and the alignment axis direction 200 of the light incident-side substrate 102 are orthogonal to each other.

With the exception of the cell thickness (4.0 μm) and the alignment axis direction 200, the configurations of the TN cells 100 of the present embodiment are the same as those of the TN cells 100 of Embodiment 4. As illustrated in FIG. 34, in the present embodiment, in the first TN cell 100 and the second TN cell 100, and in the fourth TN cell 100 and the fifth TN cell 100, the alignment axis direction 200 of the light emitting-side substrate 104 and the alignment axis direction 200 of the light incident-side substrate 102 are orthogonal to each other. In the other adjacent TN cells 100, the alignment axis direction 200 of the light emitting-side substrate 104 and the alignment axis direction 200 of the light incident-side substrate 102 match.

Figures 35, 36:
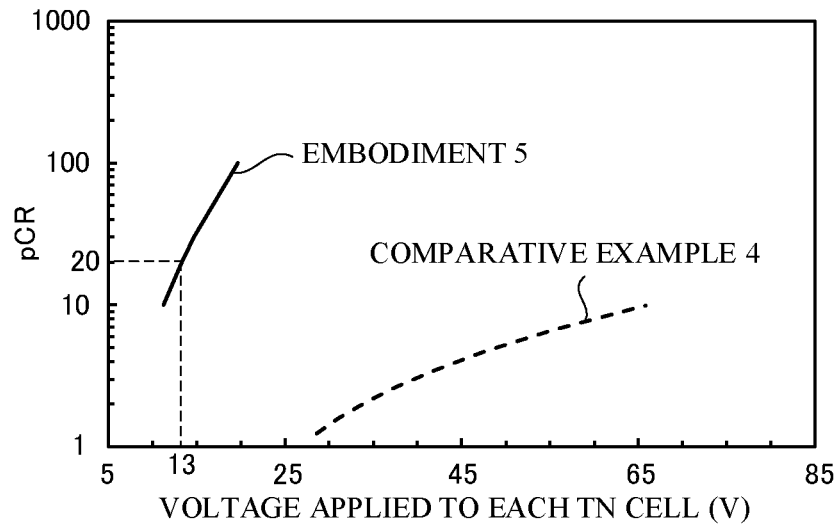
FIG. 35 is a drawing illustrating the relationship between voltage to be applied to each of the TN cells and a polarization contrast according to Embodiment 5.
FIG. 36 is a drawing illustrating the polarization contrast and an optimal voltage according to Embodiment 5.

FIG. 35 illustrates the relationship between the voltage to be applied to each of the TN cells 100, and the polarization contrast pCR of the polarization modulation element 10 of the present embodiment and the polarization contrast pCR of a polarization modulation element of Comparative Example 4. As illustrated in FIG. 35, with the polarization modulation element 10 of the present embodiment, it is possible to obtain a high polarization contrast pCR with low voltage. For example, it is sufficient to apply 13V to each of the TN cells 100 in order to set the polarization contrast pCR to 20. Note that, with the exception of the cell thickness (4.0 μm) of the TN cells 100, a polarization modulation element of Comparative Example 4 is the same as the polarization modulation element of Comparative Example 3.

Furthermore, as with the polarization modulation element 10 of Embodiment 2 and Embodiment 3, with the polarization modulation element 10 of the present embodiment, it is possible to obtain a high polarization contrast pCR with lower voltage by optimizing the voltage to be applied to the TN cells 100. For example, as illustrated in FIG. 36, it is sufficient to apply 5.4V to the first TN cell 100, 17.3V to the second to the fourth TN cells 100, and 11.3V to the fifth and the sixth TN cells 100 in order to set the polarization contrast pCR to 20. In this case, an average value of the voltage applied to one of the TN cells 100 is 13.3V. Accordingly, when the voltage to be applied to the TN cells 100 is optimized, it is possible to obtain a high polarization contrast pCR with lower voltage than with the polarization modulation element 10 of Embodiment 4. The optimal voltage of the present embodiment can be obtained by the same method as for the optimal voltage of Embodiment 2.

Thus, in the present embodiment as well, it is possible to obtain a high polarization contrast pCR with low voltage. Accordingly, the polarization modulation element 10 of the present embodiment can emit, at high intensity and with low voltage, a polarized component having a desired polarization direction.

Embodiment 6

In the present embodiment, a three-dimensional-image display device 510 that uses the polarization modulation element 10 of Embodiment 1 to Embodiment 5 is described. In one example, the polarization modulation element 10 is used in a three-dimensional-image display device 510 that displays three-dimensional images by a depth fused 3D (DFD) method. The polarization modulation element 10 functions as a polarization switching element in the three-dimensional-image display device 510.

In one example, the three-dimensional-image display device 510 is combined with eyepieces, and is used as a head-mounted display. In the present embodiment, an example of a three-dimensional-image display device 510 that uses a monochrome liquid crystal panel is described.

Figure 37:
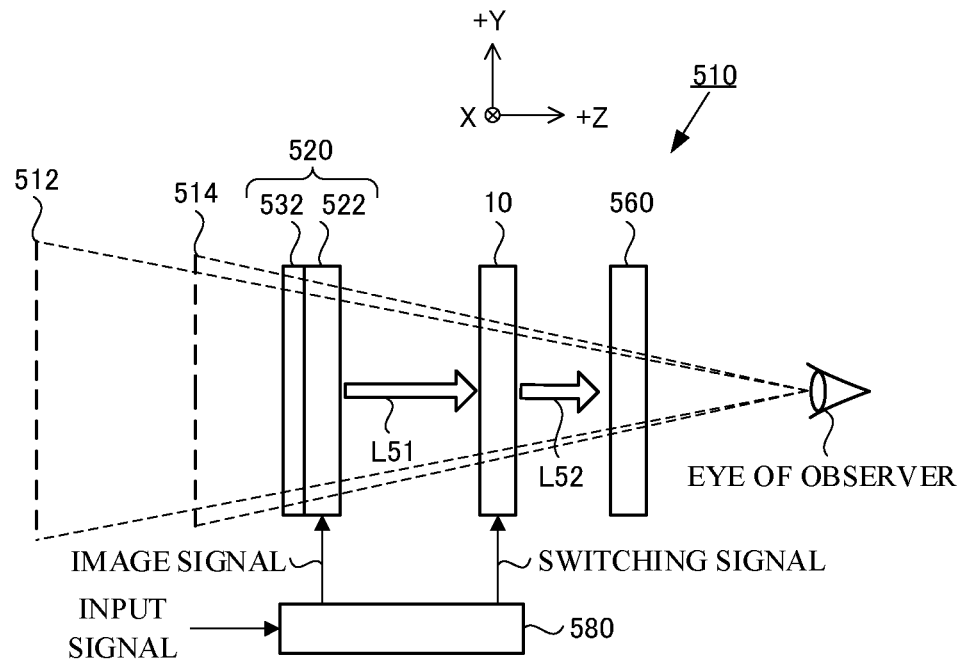
FIG. 37 is a schematic drawing illustrating a three-dimensional-image display device according to Embodiment 6.

As illustrated in FIG. 37, the three-dimensional-image display device 510 includes a display unit 520, the polarization modulation element 10, a polarized bifocal lens 560, and a controller 580. The display unit 520 sequentially displays a first image and a second image in time divisions. The display unit 520 emits display light L51 of the first image and the second image as polarized light for which the polarization direction is a predetermined first direction. The polarization modulation element 10 switches the polarization direction of the display light L51 emitted from the display unit 520 between the predetermined first direction and a predetermined second direction. The polarized bifocal lens 560 forms each of the first image and the second image as a virtual image on each of the first display surface 512 and the second display surface 514. The controller 580 supplies, to the display unit 520, a first image signal expressing the first image and a second image signal expressing the second image. Additionally, the controller 580 controls the switching of the polarization direction of the polarization modulation element 10.

In the present embodiment, the predetermined first direction is the X direction, and the predetermined second direction is the Y direction. Additionally, the display light L51 corresponds to the linearly polarized light L1 incident on the polarization modulation element 10 of Embodiments 1 to 5. Furthermore, the first image signal expressing the first image and the second image signal expressing the second image may be collectively referred to as "image signals."

The display unit 520 of the three-dimensional-image display device 510 includes a liquid crystal display panel 522 and a light source 532. The liquid crystal display panel 522 modulates, on the basis of the first image signal expressing the first image and the second image signal expressing the second image supplied from the controller 580, light emitted from the light source 532, thereby sequentially displaying the first image and the second image in time divisions. The liquid crystal display panel 522 emits the display light L51 expressing the images (for example, the first image and the second image) as polarized light for which the polarization direction is the predetermined first direction. The display light L51 emitted from the liquid crystal display panel 522 enters the polarization modulation element 10.

The first image and the second image are two-dimensional images obtained by projecting, from the side of the observer, a display subject on each of the first display surface 512 and the second display surface 514 that are positioned at different positions in a depth direction (the −Z direction) from the perspective of the observer. The first display surface 512 and the second display surface 514 are described later.

Figure 38:
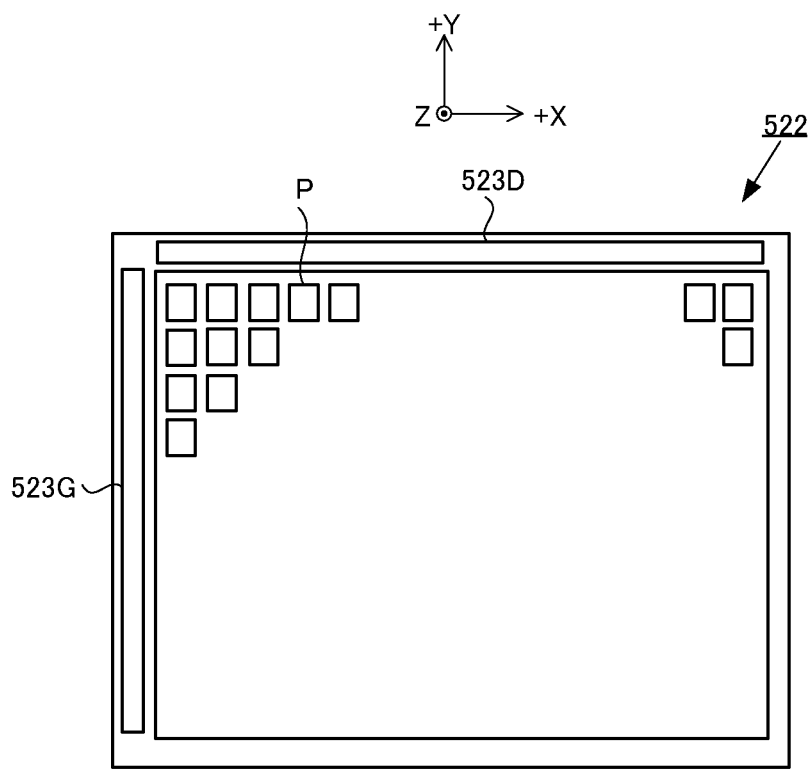
FIG. 38 is a plan view illustrating a liquid crystal display panel according to Embodiment 6.

In one example, the liquid crystal display panel 522 is implemented as a transmissive TN liquid crystal panel that is active matrix driven by thin film transistors (TFT). As illustrated in FIG. 38, the liquid crystal display panel 522 includes pixels P arranged in a matrix, a gate driver 523G and a data driver 523D. The gate driver 523G sequentially selects the pixels P by row, and performs line progressive scanning in the −Y direction. The data driver 523D supplies, to each of the selected pixels P, a voltage corresponding to an image signal, thereby writing the image signal to each of the pixels P. Note that FIG. 38 illustrates only a portion of the pixels P arranged in the matrix. Additionally, the liquid crystal display panel 522 includes a polarizing plate, a liquid crystal, and the like (not illustrated in the drawings).

The light source 532 is a light source that emits light on the liquid crystal display panel 522. As illustrated in FIG. 37, the light source 532 is arranged on the back surface side (the −Z side) of the liquid crystal display panel 522. In one example, the light source 532 is implemented as a direct back light. The light source 532 includes a white light emitting diode (LED), a reflective sheet, a diffusion sheet, and the like (all not-illustrated in the drawings).

The polarization modulation element 10 of the three-dimensional-image display device 510 switches, on the basis of a switching signal that is supplied from the controller 580 and is synchronized with the image signals, the polarization direction of the display light L51 emitted from the display unit 520 between the predetermined first direction (the X direction) and the predetermined second direction (the Y direction). Specifically, when the first image is being displayed on the liquid crystal display panel 522 of the display unit 520, the polarization modulation element 10 maintains the polarization direction of the incident display light L51 in the X direction and emits. Meanwhile, when the second image is being displayed on the liquid crystal display panel 522 of the display unit 520, the polarization modulation element 10 switches the polarization direction of the incident display light L51 to the Y direction and emits.

When an OFF level switching signal is supplied, the polarization modulation element 10 rotates the polarization direction of the display light L51 90°, and emits a display light L52 for which the polarization direction is the Y direction (the initial alignment state). Meanwhile, when an ON level switching signal is supplied to the polarization modulation element 10, the polarization modulation element 10 emits the display light L52 while maintaining the polarization direction of the display light L51 in the X direction (the ON state). The display light L52 corresponds to the emission light L2 emitted from the polarization modulation element 10 in Embodiments 1 to 5.

The display light L52 emitted from the polarization modulation element 10 enters the polarized bifocal lens 560. The switching signal is described later.

The polarized bifocal lens 560 of the three-dimensional-image display device 510 is a lens for which the focal distance for the display light L52 emitted from the polarization modulation element 10 differs depending on the polarization direction (the X direction and the Y direction) of the display light L52. The polarized bifocal lens 560 forms each of the first image and the second image as a virtual image from the perspective of the observer on each of the first display surface 512 and the second display surface 514. The first display surface 512 and the second display surface 514 are imaginary display surfaces positioned at different positions in the depth direction (the −Z direction) from the perspective of the observer. In the present embodiment, as illustrated in FIG. 37, from the perspective of the observer, the first display surface 512 and the second display surface 514 are positioned farther away than the display unit 520. Additionally, the second display surface 514 is positioned more to the observer side (the −Z side) than the first display surface 512.

The observer views the virtual image of the first image on the first display surface 512 and the virtual image of the second image on the second display surface 514 that are sequentially displayed in time divisions, and recognizes that the display subject is positioned between the first display surface 512 and the second display surface 514. The position of the display subject that the observer recognizes can be changed by adjusting the brightness (for example, the luminance) ratio of the first image to the second image. For example, when the brightness ratio of the first image to the second image is 1:1, the observer recognizes that the display subject is positioned between the first display surface 512 and the second display surface 514.

Figure 39:
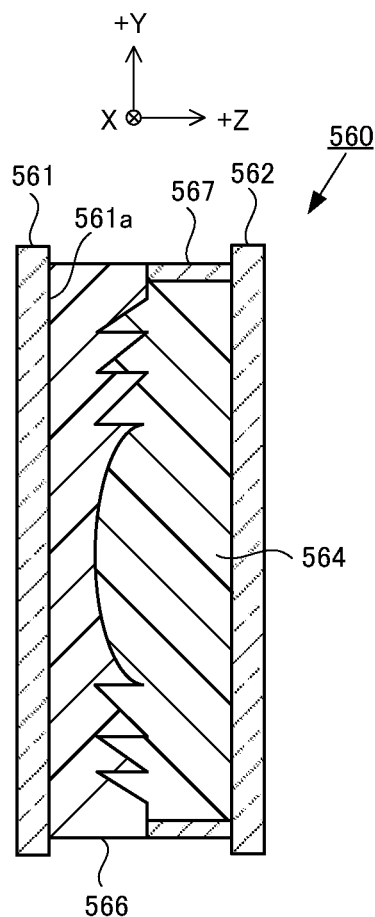
FIG. 39 is a cross-sectional view illustrating a polarized bifocal lens according to Embodiment 6.

In one example, the polarized bifocal lens 560 is implemented as a liquid crystal lens. As illustrated in FIG. 39, the polarized bifocal lens (the liquid crystal lens) 560 includes a first light-transmitting substrate 561, a second light-transmitting substrate 562, and a liquid crystal 564.

In one example, the first light-transmitting substrate 561 and the second light-transmitting substrate 562 are implemented as glass substrates. The first light-transmitting substrate 561 includes a resin Fresnel lens 566 on a main surface 561a that faces the second light-transmitting substrate 562. The first light-transmitting substrate 561 and the second light-transmitting substrate 562 are adhered to each other by a sealing material 567, and sandwich the liquid crystal 564. In one example, the liquid crystal 564 is implemented as a nematic liquid crystal that has positive refractive index anisotropy ($\Delta n = ne - no > 0$, where ne is the extraordinary light refractive index, and no is the ordinary light refractive index). The liquid crystal 564 is aligned in the X direction by a non-illustrated alignment film.

When the display light L52 of the first image that has the polarization direction in the X direction, enters the polarized bifocal lens 560, the liquid crystal (the nematic liquid crystal) 564 that has positive refractive index anisotropy is aligned with the X direction and, as such, the focal distance of the polarized bifocal lens 560 for the display light L52 is short, and the first image is formed on the first display surface 512. Meanwhile, when the display light L52 of the second image that has the polarization direction in the Y direction, enters the polarized bifocal lens 560, the focal distance of the polarized bifocal lens 560 for the display light L52 is long, and the second image is formed on the second display surface 514.

Figure 40:
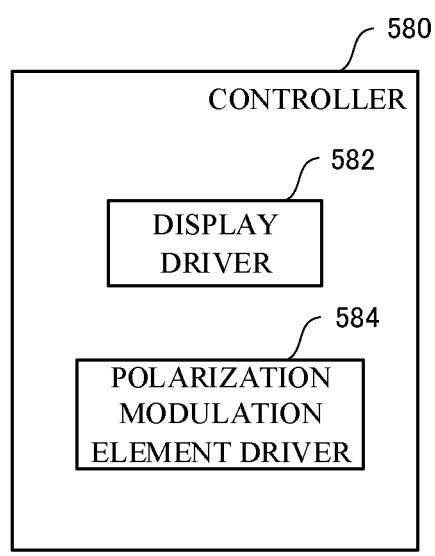
FIG. 40 is a block diagram illustrating a controller according to Embodiment 6.

The controller 580 of the three-dimensional-image display device 510 controls the liquid crystal display panel 522 of the display unit 520, and the polarization modulation element 10 on the basis of input signals input from a non-illustrated external device. As illustrated in FIG. 40, the controller 580 includes a display driver 582 and a polarization modulation element driver 584.

The display driver 582 of the controller 580 generates, from the input signals, the first image signal for displaying the first image and the second image signal for displaying the second image. Additionally, the display driver 582 supplies the image signals to the liquid crystal display panel 522. Furthermore, the display driver 582 supplies, to the polarization modulation element driver 584, a synchronization signal that synchronizes the start of supplying of the image signals.

The polarization modulation element driver 584 of the controller 580 generates a switching signal on the basis of the synchronization signal supplied from the display driver 582. The polarization modulation element driver 584 supplies the generated switching signal to the polarization modulation element 10. In the present embodiment, when the first image is to be displayed on the liquid crystal display panel 522, the polarization modulation element driver 584 sets the switching signal to the ON level and supplies the switching signal to the polarization modulation element 10.

FIG. 41 illustrates the hardware configuration of the controller 580. The controller 580 includes a central processing unit (CPU) 592, a read-only memory (ROM) 594, a random access memory (RAM) 596, and an input/output interface 598. The CPU 592, the ROM 594, the RAM 596, and the input/output interface 598 are connected by a bus 599. The CPU 592 executes various types of processings. The ROM 594 stores programs and data. The RAM 596 stores data. The input/output interface 598 inputs and outputs signals to and from the CPU 592, the liquid crystal display panel 522, the polarization modulation element 10, and the external device. The CPU 592 executes the programs stored in the ROM 594 to realize the functions of the controller 580.

As described in Embodiments 1 to 5, the polarization modulation element 10 can emit, at high intensity and with low voltage, a polarized component having a desired polarization direction (the X direction). Accordingly, with the three-dimensional-image display device 510 that includes the polarization modulation element 10, the phenomenon of the three-dimensional image not displaying correctly due to the virtual image of the first image and the virtual image of the second image of the second display surface 514 mixing can be suppressed with low voltage.

Modified Examples

Embodiments have been described, but various modifications can be made to the present disclosure without departing from the spirit and scope of the present disclosure.

For example, the light-transmitting electrodes 102b, 104b are not limited to ITO, and may be formed from another material.

In the embodiments, the twist angles α of the TN cells 100 forming the polarization modulation element 10 are equal. However, a configuration is possible in which the twist angles α of the TN cells 100 forming the polarization modulation element 10 are mutually different.

It is sufficient that the polarization modulation element 10 includes N (where N is an integer of 3 or greater) of the TN cells 100, and it is sufficient that, in at least one of the TN cells 100 that are adjacent, the alignment axis direction 200 of the light emitting-side substrate 104 of one of the TN cells 100 and the alignment axis direction 200 of the light incident-side substrate 102 of another of the TN cells 100 are orthogonal to each other. For example, a configuration is possible in which, as in Modified Example 1 and Modified Example 2 below, the polarization modulation element 10 includes eight (N=8) of the TN cells 100.

Modified Example 1

The polarization modulation element 10 of the present modified example includes eight (N=8) of the TN cells 100 for which the twist direction is identical. The TN cells 100 are sequentially stacked with the light incident-side substrate 102 of one of the TN cells 100 and the light emitting-side substrate 104 of another of the TN cells 100 opposing each other. With the exception of the cell thickness (2.74 μm) and the alignment axis direction 200, the configurations of the TN cells 100 of the present modified example are the same as those of the TN cells 100 of Embodiment 1. In the initial alignment state, the nematic liquid crystal 106 of the TN cells 100 of the present modified example are aligned twisted clockwise when viewed from above from the +Z side. The twist angle α of the TN cells 100 is 11.25°, and the sum of the twist angles α of each of the TN cells 100 is 90°. FIG. 42 illustrates the alignment axis direction 200 of the TN cells 100 of the present modified example. As illustrated in FIG. 42, in the present modified example, in the fourth (N/2$^{th}$) TN cell 100 and the fifth ((N/2)+1$^{th}$) TN cell 100, the alignment axis direction 200 of the light emitting-side substrate 104 and the alignment axis direction 200 of the light incident-side substrate 102 are orthogonal to each other. In the other adjacent TN cells 100, the alignment axis direction 200 of the light emitting-side substrate 104 and the alignment axis direction 200 of the light incident-side substrate 102 match. In the present modified example as well, as in Embodiments 1 to 5, it is possible to obtain a high polarization contrast pCR with low voltage, and it is possible to emit, at high intensity, a polarized component having a desired polarization direction. Furthermore, the number of the TN cells 100 is great and, as such, the cell thickness of the TN cells 100 can be reduced. The response time of the TN cells 100 can be shortened by reducing the cell thickness of the TN cells 100.

Modified Example 2

A configuration is possible in which, in the polarization modulation element 10 including eight of the TN cells 100 (N=8), in two of the TN cells 100 that are adjacent, the alignment axis direction 200 of the light emitting-side substrate 104 and the alignment axis direction 200 of the light incident-side substrate 102 are orthogonal to each other. With the exception of the cell thickness (2.74 μm) and the alignment axis direction 200, the configurations of the TN cells 100 of the present modified example are the same as those of the TN cells 100 of Modified Example 1. As illustrated in FIG. 43, in the present modified example, in the second TN cell 100 and the third TN cell 100, and in the sixth TN cell 100 and the seventh TN cell 100, the alignment axis direction 200 of the light emitting-side substrate 104 and the alignment axis direction 200 of the light incident-side substrate 102 are orthogonal to each other. In the other adjacent TN cells 100, the alignment axis direction 200 of the light emitting-side substrate 104 and the alignment axis direction 200 of the light incident-side substrate 102 match. In the present modified example as well, as in Embodiments 1 to 5, it is possible to obtain a high polarization contrast pCR with low voltage, and it is possible to emit, at high intensity, a polarized component having a desired polarization direction. Furthermore, the number of the TN cells 100 is great and, as such, the cell thickness of the TN cells 100 can be reduced. The response time of the TN cells 100 can be shortened by reducing the cell thickness of the TN cells 100.

When the polarization modulation element 10 includes an even number of the TN cells 100 and, in the N/2$^{th}$ TN cell 100 and the (N/2)+1$^{th}$ TN cell 100, the alignment axis direction 200 of the light emitting-side substrate 104 and the alignment axis direction 200 of the light incident-side substrate 102 are orthogonal to each other (Embodiment 1, Embodiment 4, and Modified Example 1), the polarization contrast pCR in the initial alignment state hardly changes even when the polarization direction 250 of the incident linearly polarized light L1 shifts from the alignment axis direction 200 of the light incident-side substrate 102 of the first TN cell 100. In Embodiment 3, Embodiment 5 and Modified Example 2 as well, as in Embodiment 1, Embodiment 4, and the like, the polarization contrast pCR in the initial alignment state hardly changes even when the polarization direction 250 of the incident linearly polarized light L1 shifts from the alignment axis direction 200 of the light incident-side substrate 102 of the first TN cell 100. Accordingly, the polarization modulation element 10 described above can emit, at high intensity and with low voltage, a polarized component having a desired polarization direction, even when the polarization direction 250 of the linearly polarized light L1 shifts from the alignment axis direction 200 of the light incident-side substrate 102 of the first TN cell 100.

Figure 45:
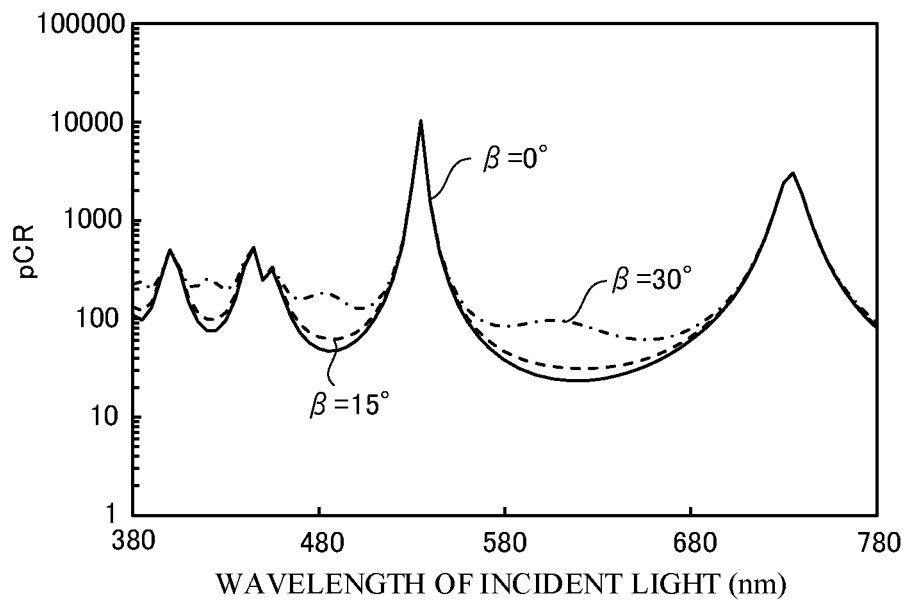
FIG. 45 is a drawing illustrating the polarization contrast in the initial alignment state of the polarization modulation element of Embodiment 1, according to a modified example.
Figure 46:
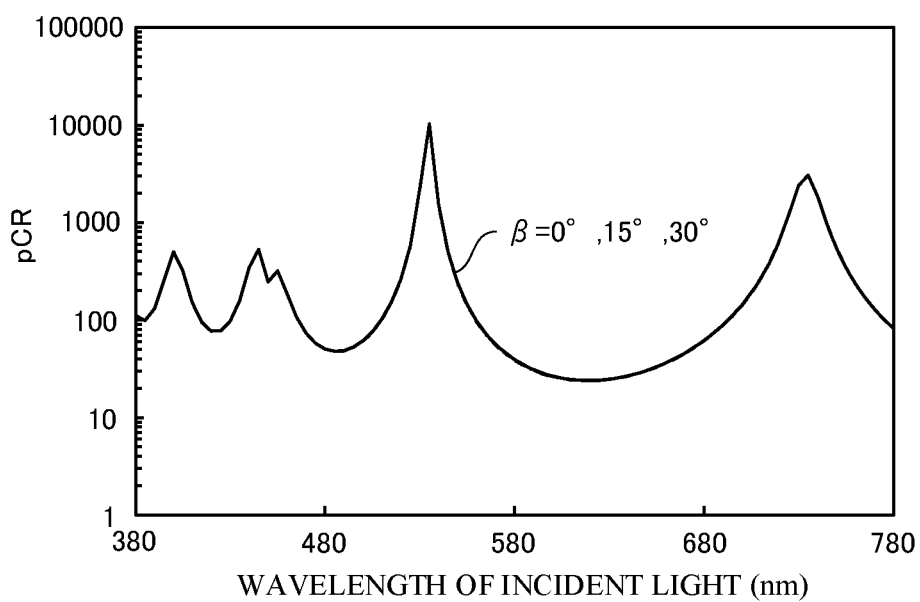
FIG. 46 is a drawing illustrating the polarization contrast in the initial alignment state of the polarization modulation element of Embodiment 3, according to a modified example.
Figure 47:
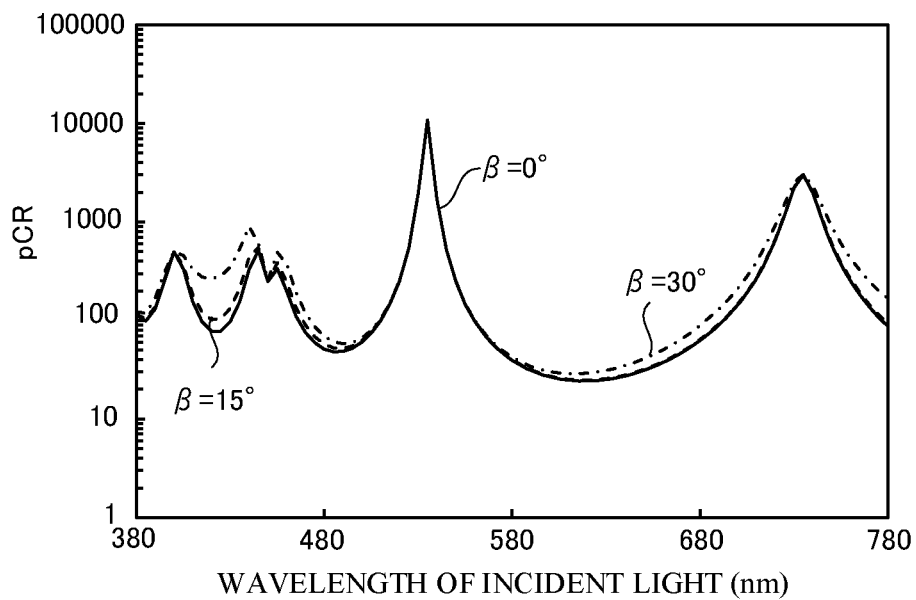
FIG. 47 is a drawing illustrating the polarization contrast in the initial alignment state of the polarization modulation element of Embodiment 5, according to a modified example.
Figure 48:
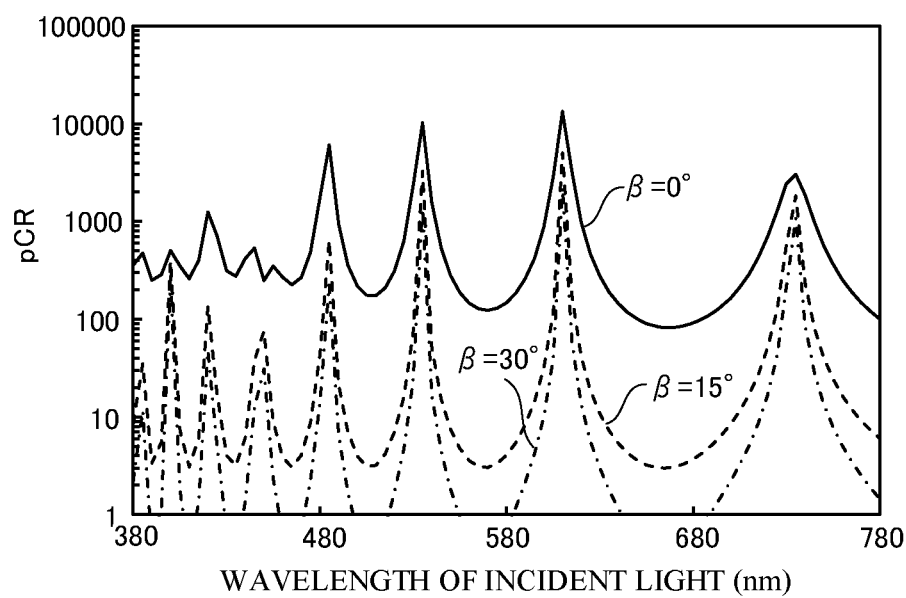
FIG. 48 is a drawing illustrating the polarization contrast in the initial alignment state of the polarization modulation element of Comparative Example 1, according to a modified example.

For example, as illustrated in FIG. 44, when an angle formed by the alignment axis direction 200 of the first TN cell 100 and the polarization direction 250 of the linearly polarized light L1 is an angle β, the polarization contrast pCR in the initial alignment state of the polarization modulation element 10 of Embodiment 1 hardly changes due to the angle β, as illustrated in FIG. 45. Additionally, the polarization contrast pCR in the initial alignment state of the polarization modulation element 10 of Embodiment 3 hardly changes due to the angle β, as illustrated in FIG. 46. Furthermore, the polarization contrast pCR in the initial alignment state of the polarization modulation element 10 of Embodiment 5 hardly changes due to the angle β, as illustrated in FIG. 47. However, the polarization contrast pCR in the initial alignment state of the polarization modulation element 50A of Comparative Example 1 depends on the angle β and changes greatly, as illustrated in FIG. 48.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A polarization modulation element comprising:
   N twisted nematic liquid crystal cells for which a twist direction is identical, N being an integer of 3 or greater, wherein
   each of the twisted nematic liquid crystal cells includes a light incident-side substrate and a light emitting-side substrate that sandwich a liquid crystal,
   a total twist angle when all of individual twist angles of the N twisted nematic liquid crystal cells are added together is 90°,
   the twisted nematic liquid crystal cells are sequentially stacked with the light incident-side substrate of one of the twisted nematic liquid crystal cells opposing the light emitting-side substrate of another of the twisted nematic liquid crystal cells,
   the twisted nematic liquid crystal cells form sets of the twisted nematic liquid crystal cells, each set including two of the twisted nematic liquid crystal cells that are adjacent with the light emitting-side substrate of one of the two twisted nematic liquid crystal cells opposing the light incident-side substrate of the other one of the two twisted nematic liquid crystal cells,
   in at least one set of the twisted nematic liquid crystal cells, an alignment axis direction of the light emitting-side substrate opposing the light incident-side substrate and an alignment axis direction of the light incident-side substrate opposing the light emitting-side substrate are orthogonal to each other, and
   in the sets of the twisted nematic liquid crystal cells, except for the at least one set of the twisted nematic liquid crystal cells, the alignment axis direction of the light emitting-side substrate opposing the light incident-side substrate and the alignment axis direction of the light incident-side substrate opposing the light emitting-side substrate match.

2. The polarization modulation element according to claim 1, wherein
   N is an even number, and
   in the sets of the twisted nematic liquid crystal cells each including an $N/2^{th}$ twisted nematic liquid crystal cell and an $(N/2)+1^{th}$ twisted nematic liquid crystal cell, the alignment axis direction of the light emitting-side substrate opposing the light incident-side substrate and the alignment axis direction of the light incident-side substrate opposing the light emitting-side substrate are orthogonal to each other.

3. The polarization modulation element according to claim 1, wherein in two of the twisted nematic liquid crystal cells that are adjacent, the alignment axis direction of the light emitting-side substrate opposing the light incident-side substrate and the alignment axis direction of the light incident-side substrate opposing the light emitting-side substrate are orthogonal to each other.

4. The polarization modulation element according to claim 3, wherein
   N is 4, and
   in a first twisted nematic liquid crystal cell and a second twisted nematic liquid crystal cell, and a third twisted nematic liquid crystal cell and a fourth twisted nematic liquid crystal cell, the alignment axis direction of the light emitting-side substrate opposing the light incident-side substrate and the alignment axis direction of the light incident-side substrate opposing the light emitting-side substrate are orthogonal to each other.

5. The polarization modulation element according to claim 3, wherein
   N is 6, and
   in a first twisted nematic liquid crystal cell and a second twisted nematic liquid crystal cell, and a fourth twisted nematic liquid crystal cell and a fifth twisted nematic liquid crystal cell, the alignment axis direction of the light emitting-side substrate opposing the light incident-side substrate and the alignment axis direction of the light incident-side substrate opposing the light emitting-side substrate are orthogonal to each other.

6. The polarization modulation element according to claim 3, wherein
   N is 8, and
   in a second twisted nematic liquid crystal cell and a third twisted nematic liquid crystal cell, and a sixth twisted nematic liquid crystal cell and a seventh nematic liquid crystal cell, the alignment axis direction of the light emitting-side substrate opposing the light incident-side substrate and the alignment axis direction of the light incident-side substrate opposing the light emitting-side substrate are orthogonal to each other.

7. The polarization modulation element according to claim 1, wherein the twist angles of the twisted nematic liquid crystal cells are equal.

8. A three-dimensional-image display device comprising:
   the polarization modulation element according to claim 1;
   a display unit that sequentially displays a first image and a second image, and emits display light of the first image and display light of the second image as polarized light, that enters the polarization modulation element, for which a polarization direction is a predetermined first direction; and a polarized bifocal lens into which emission light emitted from the polarization modulation element enters, and in which a focal distance for the emission light emitted from the polarization modulation element differs based on the polarization direction of the emission light, wherein the first image and the second image are two-dimensional images obtained by projecting, from a side of an observer, a display subject on each of a first display surface and a second display surface positioned at different positions in a depth direction from a perspective of the observer, the polarization modulation element maintains the polarization direction of the polarized light in the predetermined first direction and emits when the polarized light is the display light of the first image, and changes the polarization direction of the polarized light to a second direction orthogonal to the predetermined first direction and emits when the polarized light is the display light of the second image, thereby switching the polarization direction of the emission light between the predetermined first direction and the second direction and emitting, and the polarized bifocal lens forms each of the first image and the second image as a virtual image on each of the first display surface and the second display surface.

\* \* \* \* \*